（12）United States Patent
Inoue et al.

(10) Patent No.: US 6,850,401 B2
(45) Date of Patent: Feb. 1, 2005

(54) DC-DC CONVERTER

(75) Inventors: Manabu Inoue, Uji (JP); Hiroyuki Handa, Hirakata (JP); Hirosi Higasitani, Habikino (JP); Takuya Ishii, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 74 days.

(21) Appl. No.: 10/447,066

(22) Filed: May 27, 2003

(65) Prior Publication Data

US 2003/0222629 A1 Dec. 4, 2003

(30) Foreign Application Priority Data

May 28, 2002 (JP) ........................................ 2002-154617

(51) Int. Cl.[7] .............................................. H02M 3/22
(52) U.S. Cl. ........................................ 361/111; 361/18
(58) Field of Search ........................ 323/224; 361/111, 361/18

(56) References Cited

U.S. PATENT DOCUMENTS 4,958,121 A * 9/1990 Cuomo et al. .............. 361/111
5,406,468 A    4/1995 Booth
5,528,480 A * 6/1996 Kikinis et al. ................. 363/15

FOREIGN PATENT DOCUMENTS

JP          11146637 A       5/1999

* cited by examiner

*Primary Examiner*—Shawn Riley
(74) *Attorney, Agent, or Firm*—Akin Gump Strauss Hauer & Feld, LLP

(57) ABSTRACT

In a DC-DC converter equipped with an operation mode (standby operation mode) which is only for reducing consumption power in a light load state such as at the time of a start-up, there is an output power dive detecting circuit disposed which outputs a result of a comparison of an upper limit output voltage E1, which is higher a predetermined voltage than a target output voltage E0, with an output DC voltage Vo. The DC-DC converter does not enter the standby operation mode when the output DC voltage Vo is higher than the upper limit output voltage E1, which greatly improves a response speed at which the output DC voltage Vo efficiently reaches the target output voltage E0.

12 Claims, 16 Drawing Sheets

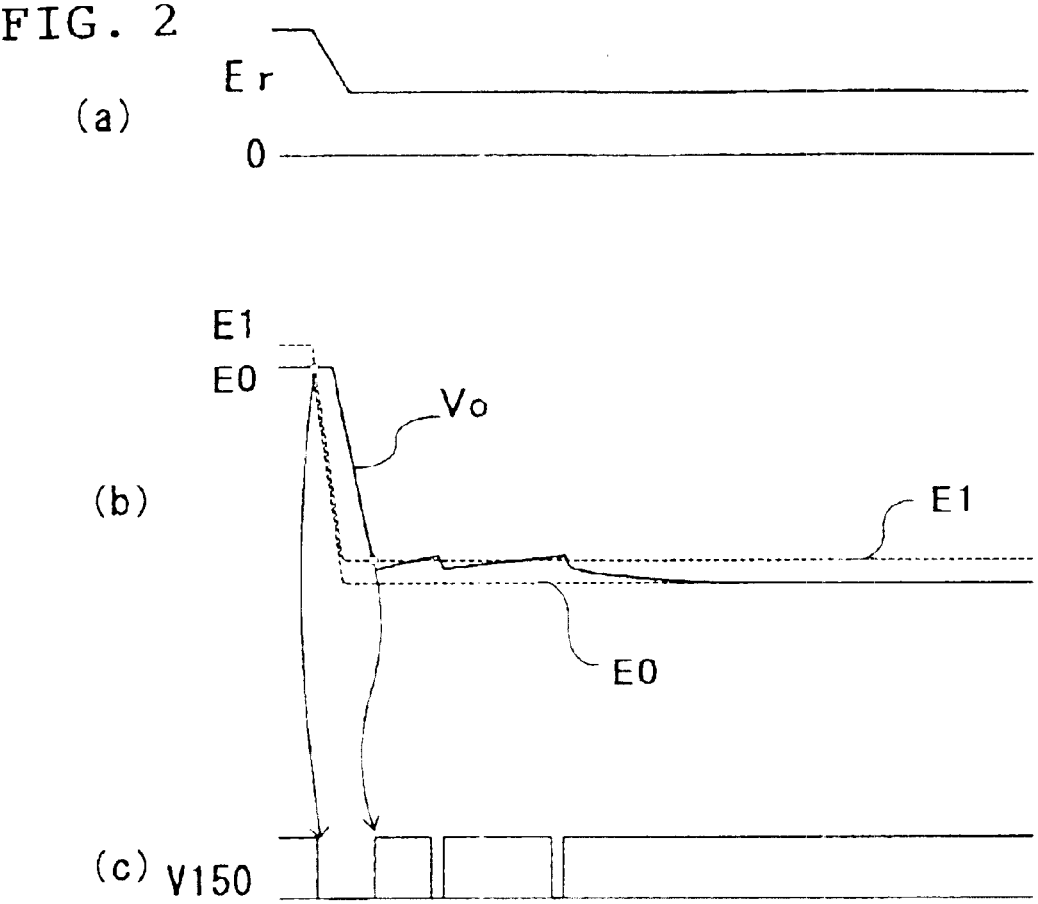
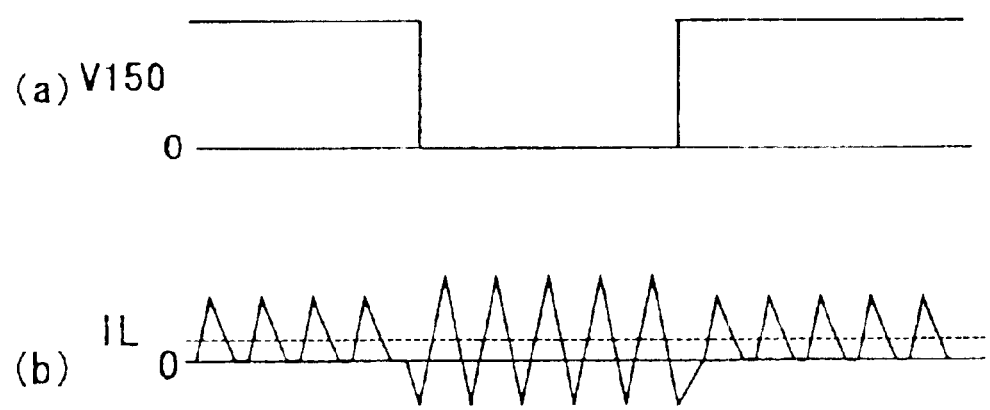

SEPIC

Zeta CONVERTER

DC-DC CONVERTER

BACKGROUND OF THE INVENTION

The present invention relates to a DC-DC converter, for use in various types of electronic equipment, which receives a DC voltage from a battery or the like and supplies a controlled DC voltage to a load. The present invention particularly relates to a DC-DC converter which is capable of quickly responding an abrupt drop in output power (output voltage and/or output current).

Among DC-DC converters which receive a DC voltage from a battery or the like as an input DC source and supply a controlled step-down DC voltage to a load include some DC-DC converters which are structured such that an operation mode is switched in accordance with the state of the load (a light load state or a heavy load state). An operation mode in a light load state herein referred to is an operation mode that electronic equipment is in a standby operation state for instance, and an operation mode in a heavy load state herein referred to is an operation mode that electronic equipment is in a normal operation state for instance. The reason for switching the operation mode in accordance with the state of a load is to reduce the consumption power of the DC-DC converter when the load is light as during a standby. A DC-DC converter having such a structure is described in Japanese Patent Application Laid-Open Gazette No. H11-146637.

FIG. 17 is a circuitry diagram which shows a structure of the conventional DC-DC converter which is described in Japanese Patent Application Laid-Open Gazette No. H11-146637. As shown in FIG. 17, the DC-DC converter, which is connected to an input DC source 301 outputting a DC voltage Vi, comprises an input-side smoothing capacitor 302, a synchronous rectifier circuit 310 and an output-side smoothing capacitor 307. A load 308 is connected to an output terminal of the DC-DC converter.

The synchronous rectifier circuit 310 of the DC-DC converter comprises a main switch 303, a synchronous switch 304, a commutating diode 305, an inductor 306, and a control part 309 which controls turning on and off of the main switch 303 and the synchronous switch 304. By means that the control part 309 switches the main switch 303 and the synchronous switch 304 in synchronization, the DC-DC converter outputs a predetermined DC voltage to the output terminal which is connected to the load 308. The DC-DC converter is structured so that the DC-DC converter switches to the operation mode in the light load state (the standby operation state) or the operation mode in the heavy load state (the normal operation state) in accordance with the state (the light load state or the heavy load state) of the load 308 which is connected to the output terminal.

In such a conventional DC-DC converter shown in FIG. 17, the DC voltage Vi of the input DC source 301 is applied to the synchronous rectifier circuit 310 via the input-side smoothing capacitor 302, and a voltage Vo from the output-side smoothing capacitor 307 is fed as an output DC voltage to the load 308. The control part 309 controls such that the synchronous switch 304 turns off when the main switch 303 is ON but turns on when the main switch 303 is OFF.

When the main switch 303 is ON, the DC voltage Vi of the input DC source 301 is applied to the inductor 306. At this time, a current flows from the input DC source 301 toward the load through the inductor 306 and magnetic energy accumulates in the inductor 306. Next, since the main switch 303 turns off, the synchronous switch 304 turns on and becomes into conduction. As a result, a current flows from the inductor 306 toward the output-side smoothing capacitor 307 through the synchronous switch 304, and the accumulated magnetic energy is released.

As described above, as the magnetic energy is accumulated and released repeatedly in the synchronous rectifier circuit 310, electric power is supplied from the output-side smoothing capacitor 307 to the load 308.

With a duty ratio, that is the on-to-off time of the main switch 303 and the synchronous switch 304, controlled by the control part 309 of the conventional DC-DC converter shown in FIG. 17, the output DC voltage Vo is capable of setting within the range from zero to the input voltage Vi.

A description will now be given on an operation of controlling the duty ratio of the main switch 303 and the synchronous switch 304 in the conventional DC-DC converter having such a structure as above.

FIG. 18 is a voltage waveform diagram which represents respective portions within the conventional DC-DC converter. In FIG. 18, denoted at Vt is a (voltage waveform which is a reference triangular waveform which linearly rises and abruptly drops, and is formed by an oscillating circuit in the control part 309. Denoted at Ve is an error voltage outputted from an error amplifier which is disposed in the control part 309, which is a difference between the output voltage Vo and a reference voltage Vref. Further, in FIG. 18, a first drive signal Vd1 is a signal which is for driving turning on and off of the main switch 303, and a second drive signal Vd2 is a signal which is for driving turning on and off of the synchronous switch 304. The output DC voltage as a target for controlling reaches a desired DC voltage by means that the main switch 303 and the synchronous switch 304 turn on and off in response to the first drive signal Vd1 and the second drive signal Vd2. The first drive signal Vd1 and the second drive signal Vd2 are generated by comparing the reference triangular waveform voltage Vt with the error voltage Ve in the error amplifier of the control part 309.

The error voltage Ve shown in FIG. 18 decreases when the output DC voltage Vo tries to increase as the load 308 becomes light, but increases when the output DC voltage Vo tries to decrease as the load 308 becomes heavy.

Further disposed to the control part 309 is a backward current prevention circuit which detects the value of a current which flows in the synchronous switch 304 when the synchronous switch 304 is ON and accordingly detects a light load state. When a current which flows in the synchronous switch 304 exceeds a predetermined value, the backward current prevention circuit determines that a light load state has occurred and turns off the synchronous switch 304.

As described above, the conventional DC-DC converter is structured such that it is possible to appropriately change the output DC voltage in accordance with the state of the load. In the DC-DC converter, for the purpose of changing the output DC voltage for a DC-DC converter which serves as a DC voltage source, when a reference voltage of this DC-DC converter is changed owing to a signal from the load or in other appropriate conditions, it is desirable that the output DC voltage rapidly responds to a change in reference voltage and becomes a desirable DC voltage.

In the conventional DC-DC converter having such a structure as above, the response speed of the conventional DC-DC converter is dependent upon a changing speed of the error voltage Ve which is outputted from the error amplifier. On the other hand, for the purpose of ensuring safety of a control system in the DC-DC converter, a cut-off frequency of the error amplifier is generally about tenths of a switching frequency which is set to tens to hundreds of kHz, because of a phase compensating capacitor or the like. Hence, a response time of the conventional DC-DC converter is hundreds microseconds in response to a stepwise change in reference voltage, and therefore, it is difficult to ensure a satisfactory response speed to a requirement from the load. In a DC-DC converter having a standby operation mode, even when the load requires to decrease an output DC voltage by changing a reference voltage, the DC-DC converter remains operating in the standby operation mode in a light load state. Such a DC-DC converter therefore has a problem that a period of time for decreasing the output DC voltage is dependent upon a discharge time of discharging from the output-side smoothing capacitor to the load and the response time further slows down.

An object of the present invention is to provide a highly versatile DC-DC converter achieving an excellent response speed by means that power is regenerated on the input side and an energy efficiency accordingly improves in a transient state or at the time of a start-up that output power sharply drops, that is a dive state in response to a load's requirement of reduction of an output DC voltage, etc.

SUMMARY OF THE INVENTION

In order to attain the above-mentioned objects, a DC-DC converter in accordance with the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a switch control circuit which adjusts ON and OFF-periods of said main switch circuit and said synchronous switch circuit based on said error voltage and controls and drives said main switch circuit;

a light load detecting circuit which detects that said load is in a light load state;

an output power dive detecting circuit which detects an output power dive state; and a synchronous switch driving circuit which receives an output from said switch control circuit, an output from said light load detecting circuit and an output from said output power dive detecting circuit, wherein (1) said synchronous switch driving circuit turns off said synchronous switch circuit when said light load detecting circuit detects a light load state and said output power dive detecting circuit fails to detect an output power dive state, (2) said synchronous switch driving circuit turns on and off said synchronous switch circuit in accordance with an output from said switch control circuit when said light load detecting circuit detects a light load state and said output power dive detecting circuit detects an output power dive state, (3) said synchronous switch driving circuit turns on and off said synchronous switch circuit in accordance with an output from said switch control circuit when said light load detecting circuit fails to detect a light load state and said output power dive detecting circuit fails to detect an output power dive state, and (4) said synchronous switch driving circuit turns on and off said synchronous switch circuit in accordance with an output from said switch control circuit when said light load detecting circuit fails to detect a light load state and said output power dive detecting circuit detects an output power dive state. In the DC-DC converter having the above-mentioned configuration, a power regenerating operation is performed upon recognition of an output power dive state, and therefore, even when an output DC voltage deviates from a target output voltage owing to some change in condition, a response speed to reach the target output voltage is remarkably improved regardless of the state of a load.

A DC-DC converter in accordance with another aspect of the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts ON and OFF-periods of said main switch circuit and said synchronous switch circuit based on said error voltage and drives said main switch circuit and said synchronous switch circuit;

an output power dive detecting circuit which detects an output power dive state; and a first transient response operation circuit which forcibly changes said error voltage so as to decrease output power, at the time of a transient response when said output power dive detecting circuit detects that output power has sharply dropped. In the DC-DC converter having the above-mentioned configuration, a power regenerating operation is performed upon recognition of an output power dive state, and therefore, even when an output DC voltage exceeds a target output voltage owing to some change in condition, a response speed to reach the target output voltage is remarkably improved regardless of a state of the load.

Further, the above-mentioned DC-DC converter may be so structured that the control circuit has an offset voltage source which outputs an offset voltage, and further comprises a second transient response operation circuit which forcibly changes said offset voltage so as to decrease said output power, at the time of a transient response when said output power dive detecting circuit detects that output power has sharply dropped. In the DC-DC converter having the above-mentioned configuration, a power regenerating operation is performed upon recognition of an output power dive state, and therefore, even when an output DC voltage exceeds a target output voltage owing to some change in condition, a response speed to reach the target output voltage is remarkably improved regardless of a state of the load.

A DC-DC converter in accordance with another aspect of the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts the ON and OFF-periods of said main switch circuit based on said error voltage and controls and drives said main switch circuit;

an output power dive detecting circuit which detects an output power dive state;

an input/output comparison circuit which compares said input DC voltage with said output DC voltage; and a high-speed response circuit which comprises a regeneration switch circuit connected in parallel between an input and output of said DC-DC converter, and which turns on said regeneration switch circuit at the time of a transient response when said output power dive detecting circuit detects an output power dive state when said output DC voltage is higher than said input DC voltage. In the DC-DC converter having the above-mentioned configuration, a power regenerating operation is performed upon recognition of an output power dive state, and therefore, even when an output DC voltage exceeds a target output voltage owing to some change in condition, a response speed to reach the target output voltage is remarkably improved regardless of a state of the load.

A DC-DC converter in accordance with another aspect of the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a switch control circuit which adjusts ON and OFF-periods of said main switch circuit and said synchronous switch circuit based on said error voltage and controls and drives said main switch circuit;

a light load detecting circuit which detects that said load is in a light load state; and a synchronous switch driving circuit which receives an output from said switch control circuit, an output from said light load detecting circuit and a signal indicating whether output power has sharply dropped or not, wherein (1) said synchronous switch circuit turns off when said light load detecting circuit detects a light load state and said output power has not sharply dropped, (2) said synchronous switch circuit turns on and off in accordance with an output from said switch control circuit when said light load detecting circuit detects a light load state and said output power has sharply dropped, (3) said synchronous switch circuit turns on and off in accordance with an output from said switch control circuit when said light load detecting circuit fails to detect a light load state and said output power has not sharply dropped, and (4) said synchronous switch circuit turns on and off in accordance with an output from said switch control circuit when said light load detecting circuit fails to detect a light load state and said output power has sharply dropped. Since the DC-DC converter having the above-mentioned configuration provided with an external signal indicating an output power dive state, the structure that a power regenerating operation is always executed during inputting of the external signal greatly shortens a response time and permits a simplification of a circuit.

A DC-DC converter in accordance with the another aspect of the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit, which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts ON and OFF-periods of said main switch circuit and said synchronous switch circuit based on said error voltage and drives said main switch circuit and said synchronous switch circuit; and a first transient response operation circuit which forcibly changes said error voltage so as to decrease said output power, at the time of a transient response when a signal indicating output power sharply reduced is inputted from said load. Since the DC-DC converter having the above-mentioned configuration is provided with an external signal indicating an output power dive state, the structure that a power regenerating operation is always executed during inputting of the external signal greatly shortens a response time and permits a simplification of a circuit.

Further, the above-mentioned DC-DC converter may be so structured that the control circuit has an offset voltage source which outputs an offset voltage, and further comprises a second transient response operation circuit which forcibly changes said offset voltage so as to decrease said output power, at the time of a transient response when a signal indicating output power sharply reduced is inputted from said load. Since the DC-DC converter having the above-mentioned configuration is provided with an external signal indicating an output power dive state, the structure that a power regenerating operation is always executed during inputting of the external signal greatly shortens a response time and permits a simplification of the circuit.

A DC-DC converter in accordance with the another aspect of the present invention comprises:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts the ON and OFF-periods of said main switch circuit based on said error voltage and controls and drives said main switch circuit;

an input/output comparison circuit which compares said input DC voltage with said output DC voltage; and a high-speed response circuit which comprises a regeneration switch circuit connected in parallel between an input and output of said DC-DC converter, and which turns on said regeneration switch circuit at the time of a transient response when a signal indicating output power sharply reduced is inputted from said load, in case that said output DC voltage is higher than said input DC voltage. Since a DC-DC converter having such a structure as above is provided with an external signal indicating an output power dive state, the structure that a power regenerating operation is always executed during inputting of the external signal greatly shortens a response time and permits a simplification of the circuit.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2 is a waveform diagram which shows operations in respective portions of the DC-DC converter of Embodiment 1;

FIG. 3 is a waveform diagram which shows operations in respective portions of the DC-DC converter of Embodiment 1;

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

Preferred embodiments of a DC-DC converter in accordance with the present invention will be described below with reference to FIG. 1 through FIG. 16. While the preferred embodiments below are desirable specific examples of the present invention and as such impose various types of technically preferable restrictions, the scope of the present invention is not limited to these preferred embodiments unless the following description provides a particular limitation upon the present invention.

Embodiment 1

Figure 1:
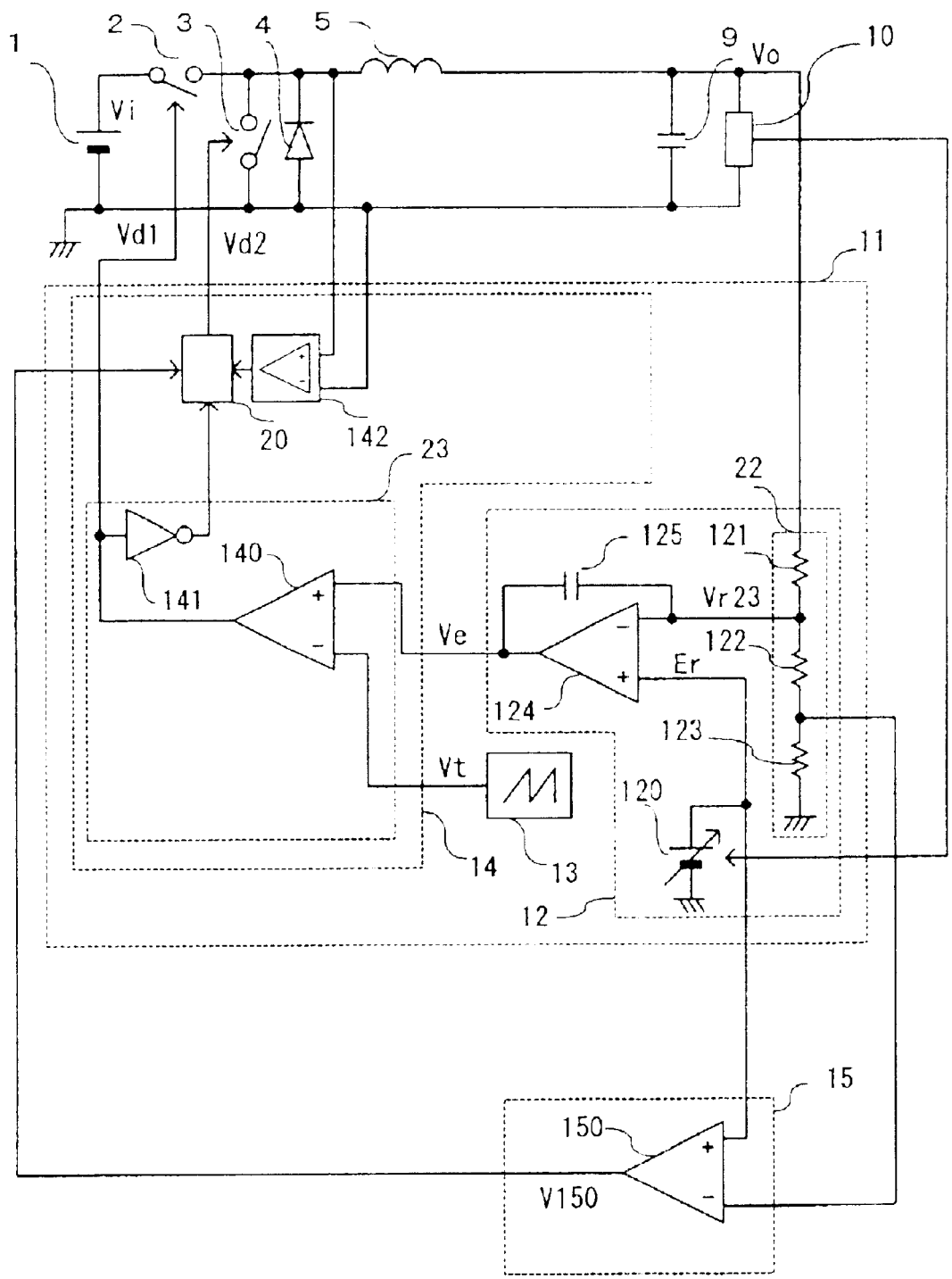
FIG. 1 is a circuitry diagram which shows a structure of a DC-DC converter according to a first preferred embodiment of the present invention.

FIG. 1 is a circuitry diagram which shows a structure of a DC-DC converter in accordance with Embodiment 1 of the present invention. As shown in FIG. 1, the DC-DC converter in accordance with Embodiment 1 is connected to an input DC source 1 which outputs an input DC voltage Vi, and one end of the input direct current source 1 is connected to one end of a first switch 2 which is a main switch circuit. The other end of the first switch 2 is connected to one end of a second switch 3 which is a synchronous switch circuit, a cathode of a first diode 4 and one end of an inductor 5. The other end of the second switch 3 and an anode of the first diode 4 are connected to the other end of the input DC source 1. The first switch 2 and the second switch 3 which are connected in this manner are operated repeatedly to turn on and off in response to a control signal fed from a control part 11 which will be described later. The control part 11 is connected to an output power dive detecting circuit 15 which detects a sharp drop of an output power, that is a dive in output.

As shown in FIG. 1, the inductor 5 and an output capacitor 9 are connected in series, thereby forming a series circuit. The both ends of the series circuit are connected to the both ends of the first diode 4, and a smoothing circuit is accordingly formed. The smoothing circuit averages a rectangular wave voltage which is developed across the both ends of the first diode 4, thereby producing a DC voltage.

A load 10 is connected to output terminals which are the both ends of the output capacitor 9 disposed on the output side in the DC-DC converter having the above-mentioned configuration. In Embodiment 1, the second switch 3, the first diode 4 and the output capacitor 9 form a rectifying and smoothing circuit.

The control part 11 is formed by an error amplifying circuit 12, an oscillating circuit 13 and a control circuit 14. The control part 11 controls an output DC voltage Vo outputted from the DC-DC converter by controlling turning on and off of the first switch 2 and the second switch 3. The control circuit 14 comprises a synchronous switch driving circuit 20, a switch control circuit 23 and a light load detecting circuit 142.

The error amplifying circuit 12 is formed by a reference voltage source 120, a detecting circuit 22 which detects the output DC voltage Vo, an error amplifier 124 which is provided with a reference voltage Er from the reference voltage source 120 and a detected voltage from the detecting circuit 22, and a phase compensating capacitor 125 which is connected between an input and an output of the error amplifier 124. The voltage Er from the reference voltage source 120 is varied in accordance with an instruction from the load 10. The detecting circuit 22 is formed by a series circuit which comprises three resistors, namely, a resistor 121, a resistor 122 and a resistor 123. A voltage at a node between the resistor 121 and the resistor 122 and the reference voltage Er are fed to the error amplifier 124. The error amplifying circuit 12 having such a structure as described above outputs to the control circuit 14 an error voltage Ve outputted from the error amplifier 124.

The output power dive detecting circuit 15 is formed by a comparator 150 which receives a voltage at a node between the resistor 122 and the resistor 123 and the reference voltage Er and compares them. The error amplifier 124 of the error amplifying circuit 12 is provided with the voltage at the node between the resistor 121 and the resistor 122 and the reference voltage Er. A target output voltage E0 is achieved when these voltages inputted to the error amplifier 124 are equal to each other. When the voltage at the node between the resistor 122 and the resistor 123 and the reference voltage Er which are fed to the comparator 150 are equal to each other, an upper limit output voltage E1 which is higher a predetermined voltage than the target output voltage E0 is achieved. When the output DC voltage Vo exceeds the upper limit output voltage E1, an output power dive state occurs. The comparator 150 detects the output power dive state, and the output power dive detecting circuit 15 outputs a signal which is indicative of the output power dive state to the synchronous switch driving circuit 20.

The oscillating circuit 13 generates a saw-tooth shape voltage Vt which is a reference triangular waveform voltage increasing and decreasing repeatedly at predetermined intervals, and outputs the saw-tooth shape voltage Vt to the control circuit 14. The saw-tooth shape voltage Vt has a triangular waveform whose cycle is T and amplitude is $\Delta Vt$, and linearly increases and abruptly drops. The switch control circuit 23 of the control circuit 14 has a comparator 140 which compares the error voltage Ve with the saw-tooth shape voltage Vt, and an inverter 141 which reverses a signal from the comparator 140. The light load detecting circuit 142 of the control circuit 14 detects the value of a current which flows through the second switch 3 when the second switch 3 is ON, and outputs the detection result to the synchronous switch driving circuit 20. The synchronous switch driving circuit 20 operates based on the detection result obtained at the output power dive detecting circuit 15, and the detection result obtained at the light load detecting circuit 142. In other words, the synchronous switch driving circuit 20 operates as described below.

(1) When receiving a signal indicating a light load state from the light load detecting circuit 142, but not receiving a signal indicating an output power dive state from the output power dive detecting circuit 15, the synchronous switch driving circuit 20 turns off the second switch 3 which is a synchronous switch circuit;

(2) when receiving a signal indicating a light load state from the light load detecting circuit 142 and receiving a signal indicating an output power dive state from the output power dive detecting circuit 15, the synchronous switch driving circuit 20 makes the second switch 3 turn on and off in accordance with an output from the switch control circuit 23;

(3) when receiving neither a signal indicating a light load state from the light load detecting circuit 142 nor a signal indicating an output power dive state from the output power dive detecting circuit 15, the synchronous switch driving circuit 20 makes the second switch 3 turn on and off in accordance with an output from the switch control circuit 23; and (4) when not receiving a signal indicating a light load state from the light load detecting circuit 142 but receiving a signal indicating an output power dive state from the output power dive detecting circuit 15, the synchronous switch driving circuit 20 makes the second switch 3 turn on and off in accordance with an output from the switch control circuit 23.

As shown in FIG. 1, an output voltage Vd1 from the comparator 140 serves as a first drive signal which is for driving turning on and off of the first switch 2. And, an output voltage Vd2 from the synchronous switch driving circuit 20 serves as a second drive signal which is for driving turning on and off of the second switch 3. Using an ON-resistance of the second switch 3, the light load detecting circuit 142 of the control circuit 14 detects the value of a current which flows through the second switch 3 in an ON-state, and acknowledges a light load state. In other words, using the ON-state resistance of the second switch 3, the light load detecting circuit 142 determines that there is a light load state, when the current which flows through the second switch 3 has exceeded a predetermined value. At this time, when the output power dive detecting circuit 15 does not detect an output power dive state, the synchronous switch driving circuit 20 turns off the second switch 3. This operation is a discontinuous-operation-mode operation which is an operation in a standby operation mode according to Embodiment 1. The standby operation mode realizes such control which prevents a backward current in a light load state.

As described above, when the output DC voltage Vo is higher than the upper limit output voltage E1, the DC-DC converter according to the present invention performs a power regenerating operation (Such a high-speed response operation mode at the time of a transient response will be hereinafter referred to as a "transient response operation mode."), and the output DC voltage Vo is accordingly reduced down to the target output voltage E0.

Operations of the DC-DC converter of Embodiment 1 having such a structure as above will now be described.

First, a normal operation mode, which is an operation mode in a heavy load state, of the DC-DC converter of Embodiment 1 will be described.

In the normal operation mode, the first switch 2 and the second switch 3 turn on and off with having the same switching cycle T by the control part 11. During the operation of the turning on and off, the second switch 3 is OFF when the first switch 2 is ON, and the second switch 3 is ON when the first switch 2 is OFF.

When the first switch 2 is ON, the input DC voltage Vi from the input DC source 1 is applied upon the inductor 5. At this time, a current flows toward the load side from the input DC source 1 via the inductor 5, and magnetic energy accumulates in the inductor 5. As the first switch 2 becomes OFF, the second switch 3 becomes ON. When the second switch 3 is ON, a current flows toward the output capacitor 9 from the inductor 5 via the second switch 3, and the magnetic energy accumulated in the inductor 5 is released.

Since the magnetic energy is accumulated and released repeatedly in the inductor 5 in this manner, electric power is supplied from the output capacitor 9 to the load 10.

As described above, the output DC voltage Vo can be set to zero through the input voltage Vi by controlling the duty ratio, that is the on-to-off time of the first switch 2 and the second switch 3 in the control part 11 of the DC-DC converter.

The above explanation is of the normal operation mode in the DC-DC converter of Embodiment 1 according to the present invention. Assuming that the resistance values of the resistor 121, the resistor 122 and the resistor 123 of the detecting circuit 22 in the error amplifying circuit 12 are R121, R122 and R123, respectively, a detected voltage Vr23 fed to the error amplifier 124 is expressed by the following formula (1). The symbol Vo denotes the output DC voltage.

$$Vr23 = [(R122+R123)/(R121+R122+R123)] \times Vo \qquad (1)$$

In the DC-DC converter of Embodiment 1, the detected voltage Vr23 is controlled such that the detected voltage Vr23 becomes equal to the reference voltage Er. Hence, during the normal operation, the output DC voltage Vo is controlled to the target output voltage E0 which is expressed by the following formula (2).

$$E0 = [(R121+R122+R123)/(R122+R123)] \times Er \qquad (2)$$

On the other hand, when the voltage at the node between the resistors 122, 123 and the reference voltage Er, which are compared by the output power dive detecting circuit 15, become equal to each other, the upper limit output voltage E1 which is the output DC voltage Vo at this time is expressed by the following formula (3).

$$E1 = [(R121+R122+R123)/R123] \times Er \qquad (3)$$

Next, a description will be given with reference to FIG. 2 and FIG. 3 on an operation in a situation that the reference voltage Er of the reference voltage source 120 has abruptly dropped due to a signal from outside, such as the load 10. A part (a) of FIG. 2 shows voltage waveforms of when the reference voltage Er has abruptly dropped. A part (b) of FIG. 2 is a waveform diagram showing a relationship between the target output voltage E0, the upper limit output voltage E1 and the output DC voltage Vo in a situation shown in the part (a) of FIG. 2. A part (c) of FIG. 2 shows a signal V150 which is outputted from the comparator 150 of the output power dive detecting circuit 15. The part (a) of FIG. 3 shows the waveform of a voltage which is outputted from the comparator 150 when the reference voltage Er has abruptly dropped. A part (b) of FIG. 3 shows the waveform of a current which flows through the inductor 5 when a signal shown in the part (a) of FIG. 3 is outputted from the comparator 150. In the current waveform shown in the part (b) of FIG. 3, a central portion represents a continuous operation mode and portions on the right-hand side and the left-hand side represent a discontinuous operation mode.

When the load 10 remains in a similar light load state, the DC-DC converter of Embodiment 1 is in the standby operation mode which is an operation mode in a light load state. In the standby operation mode, the light load detecting circuit 142 detects a light load state. At this time, since the output power dive detecting circuit 15 has detected the output power dive state, the synchronous switch driving circuit 20 turns off the second switch 3. That is, in the standby operation mode, the DC-DC converter operates in the discontinuous operation mode which is denoted at the waveform which is in the left-hand side portion in the part (b) of FIG. 3.

As described above, while the DC-DC converter is operating in the standby operation mode, when the reference voltage Er from the reference voltage source 120 is decreased in response to a signal from the load 10 or the like for example, the target output voltage E0 and the upper limit output voltage E1, too, decrease. As this occurs, the comparator 150 of the output power dive detecting circuit 15 outputs a signal "L" since the detected voltage becomes higher than the reduced reference voltage Er. The signal "L" is fed to the synchronous switch driving circuit 20. Since the output power dive detecting circuit 15 has detected the output power dive state and the light load detecting circuit 142 has detected the light load state, the synchronous switch driving circuit 20 outputs a drive voltage V141 of the inverter 141 as it is, as the output voltage Vd2 of the second switch 3. Since this makes the second switch 3 turn on and off in synchronization to the first switch 2, during a period that the comparator 150 is outputting the signal "L", the DC-DC converter does not operate in the standby operation mode but operates in the continuous operation mode. The continuous operation mode is a transient response operation mode. In the transient response operation mode, power regeneration is performed and the output DC voltage Vo abruptly decreases. This power regeneration operation continues until the output DC voltage Vo reaches the upper limit output voltage E1 and the comparator 150 of the output power dive detecting, circuit 15 gets reversed.

When the comparator 150 gets reversed, the output power dive detecting circuit 15 enters a state that the output power dive detecting circuit 15 does not detect the output power dive state. At this time, since the light load detecting circuit 142 has detected the light load state, the DC-DC converter operates in the discontinuous operation mode. However, when the error voltage Ve has not decreased sufficiently yet, the output DC voltage Vo increases and the comparator 150 gets further reversed. As a result, DC-DC converter operates in the continuous operation mode and power regeneration is performed. The power regenerating operation reduces the output DC voltage Vo, the comparator 150 gets further reversed, and the discontinuous operation mode takes over. In this manner, the operation in the continuous operation mode and the operation in the discontinuous operation mode are repeated. As a result, the error voltage Ve decreases sufficiently, and the output DC voltage Vo settles at the target output voltage E0.

When the load is in a light load state, the conventional DC-DC converter always operates in the standby operation mode even despite a sharp drop in target output voltage E0, and hence, a long period of time is necessary for the output DC voltage Vo to reach the target output voltage E0.

On the contrary, when the load is in a light load state, upon a sharp drop in target output voltage E0, the DC-DC converter of Embodiment 1 according to the present invention does not operate in the standby operation mode (the discontinuous operation mode) but operates in the transient response operation mode, and power regeneration is performed. Therefore, in the DC-DC converter of Embodiment 1, even when the target output voltage E0 abruptly drops while the load is in a light load state, it is possible for the output DC voltage to become the target output voltage E0 in a greatly shortened response time than in the conventional apparatus.

In the above-mentioned Embodiment 1, the step-down type converter which has a synchronous rectifying capability is used in the DC-DC converter, a DC-DC converter according to the present invention is not limited to such a structure. The present invention is applicable also to DC-DC converters having a synchronous rectifying capability of all of a step-down type, a step-up type and a set-up/and-down type.

Further, although the foregoing has described that an operation in the discontinuous operation mode is an operation in the standby operation mode according to Embodiment 1, an operation in the standby operation mode in the DC-DC converter according to the present invention is not limited only to such the discontinuous operation mode. With respect to a different operation in the standby operation mode for reducing the consumption power of the DC-DC converter, for the purpose of reducing a switching loss and the like for example, it is needless to mention that the structure according to the present invention is applicable to an intermittent operation mode in which there is a predetermined period that a switching operation is suspended and an intermittent operation is realized and also to a switching frequency variable operation mode which is for reducing a switching frequency.

Embodiment 2

Figure 4:
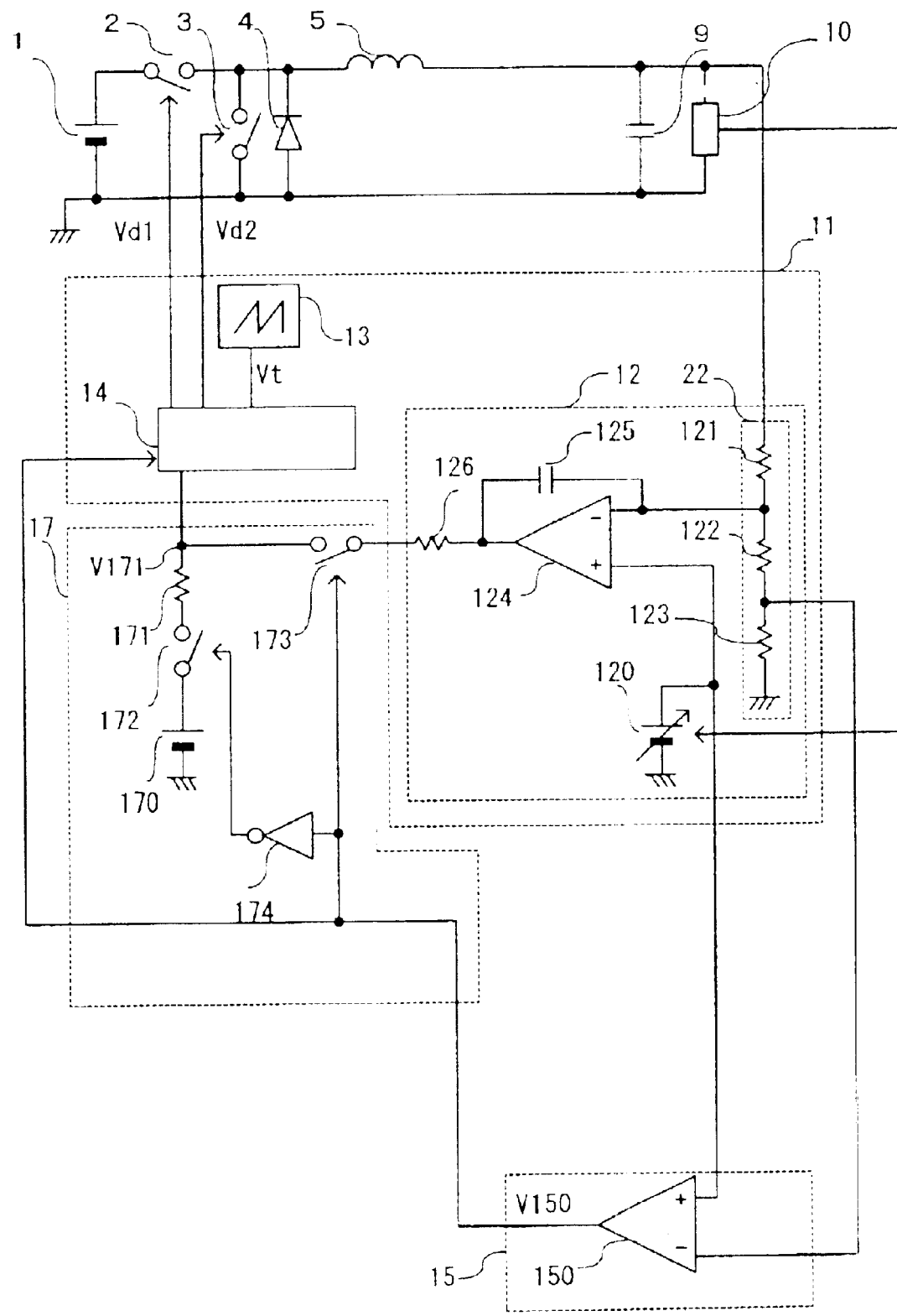
FIG. 4 is a circuitry diagram which shows a structure of a DC-DC converter according to a second preferred embodiment of the present invention.
Figure 5:
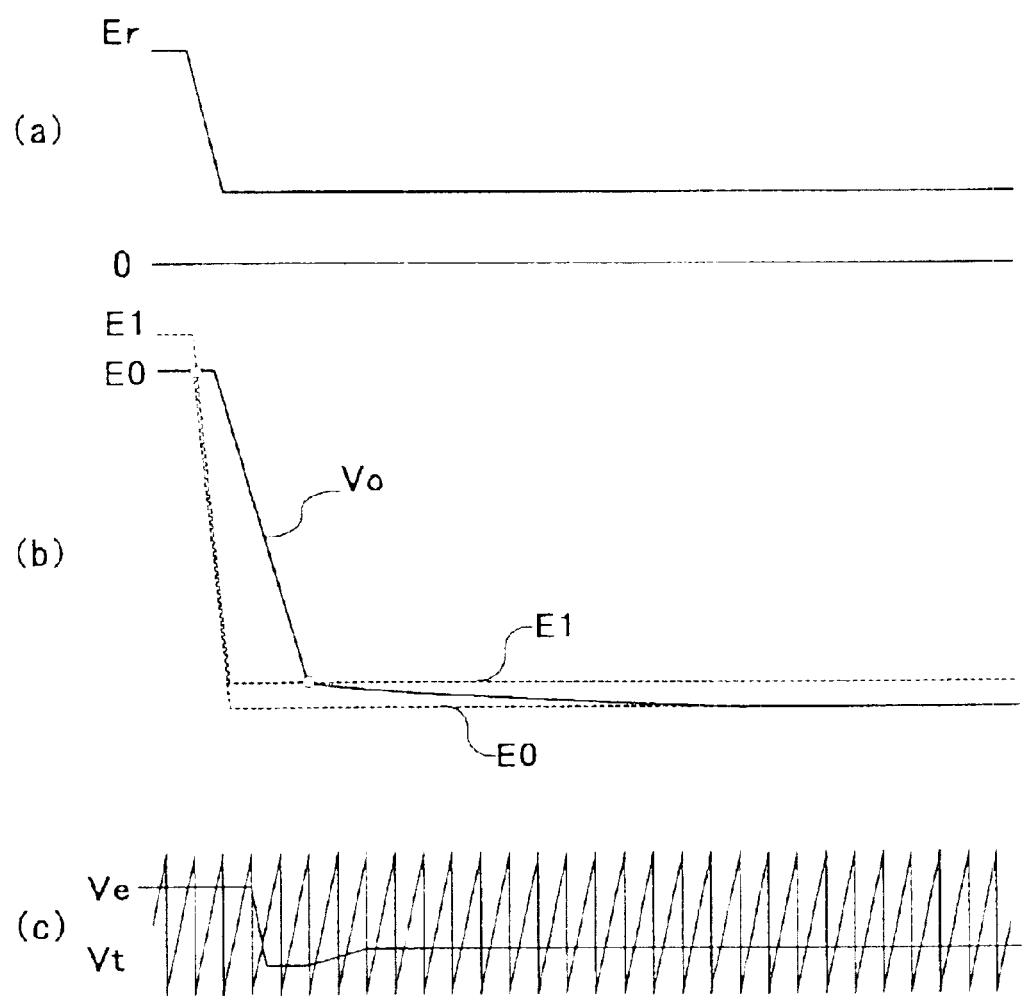
FIG. 5 is a waveform diagram which shows operations in respective portions of the DC-DC converter of Embodiment 2.

A DC-DC converter of Embodiment 2 according to the present invention will be described with reference to FIG. 4 and FIG. 5 below. FIG. 4 is a circuitry diagram showing a structure of the DC-DC converter of Embodiment 2 according to the present invention. FIG. 5 shows signal waveforms in respective portions of the DC-DC converter of Embodiment 2 when a reference voltage Er sharply drops. In the DC-DC converter of Embodiment 2, parts and elements having substantially the same functions and structures to those of the DC-DC converter of Embodiment 1 are denoted by the same reference numerals, and descriptions thereof are omitted.

The DC-DC converter of Embodiment 2 is different from the DC-DC converter of Embodiment 1 in that the error voltage Ve which is an output from the error amplifying circuit 12 is produced by an output from the error amplifier 124 through a resistor 126. Further, the DC-DC converter of Embodiment 2 comprises a first transient response operation circuit 17 which comprises an instruction voltage source 170, a resistor 171, a switch 172, a switch 173 and an inverter 174.

In the above-mentioned Embodiment 1, the power regenerating operation is performed and the output DC voltage is accordingly reduced. However, for the purpose of further improving a response speed at which the output DC voltage Vo reaches the target output voltage E0, the DC-DC converter of Embodiment 2 ensures that electric power which is regenerated by a power regenerating operation with the error voltage Ve forcibly changed is larger than electric power which is regenerated by such a power regenerating operation in which the error voltage is not forcibly changed.

When the target output voltage E0 sharply drops responding to an instruction from the load or the like, the output DC voltage Vo enters a transient response state that the output DC voltage Vo rapidly becomes higher relative to the target output voltage E0. An operation in the transient response state will be described below with reference to FIG. 5.

FIG. 5 shows signal waveforms in respective portions of the DC-DC converter of Embodiment 2 when the reference voltage Er sharply drops. In FIG. 5, shown in a part (a) is a voltage waveform representing a state that the reference voltage Er has sharply dropped and a part (b) is a waveform diagram showing a relationship between the target output voltage E0, the upper limit output voltage E1 and the output DC voltage Vo in a situation as that shown in the part (a). Shown in a part (c) are voltage waveforms of the saw-tooth shape voltage Vt and the error voltage Ve.

During a period that the output DC voltage Vo is higher than the upper limit output voltage E1, a drive voltage V150 outputted from the comparator 150 of the output power dive detecting circuit 15 is "L". Therefore, the switch 173 becomes OFF. As the switch 173 becomes OFF, an output V12 of the error amplifying circuit 12 is not transmitted to the control circuit 14.

Since the inverter 174 reverses the drive voltage V150 outputted from the comparator 150, the switch 172 turns on and an instruction voltage from the instruction voltage source 170 is fed to the control circuit 14 via the resistor 171.

An instruction voltage V171 supplied via the resistor 171 is set to a value which is slightly larger than the minimum value of the saw-tooth shape voltage Vt. In this operation, during one switching cycle, the first switch 2 becomes ON for only a very short period and the second switch 3 becomes OFF for only a very short period. This state continues until the comparator 150 is reversed and the switch 172 accordingly turns off and the switch 173 accordingly turns on. Following this, the normal operation mode or the standby operation mode starts again, and the output DC voltage Vo settles at the target output voltage E0. The resistor 126 of the error amplifying circuit 12 has a function of restricting a current which flows in the phase compensating capacitor 125 and suppressing a variation in detected voltage, when the switch 173 of the first transient response operation circuit 17 turns on.

As described above, while operating in the normal operation mode or the standby operation mode, upon detection of a transient response state, the DC-DC converter of Embodiment 2 operates such that electric power regenerated by a power regenerating operation exceeds an electric power regenerated by regenerating operation in which the error voltage is not forcibly changed, until the upper limit output voltage E1 is reached. Hence, the DC-DC converter of Embodiment 2 can shorten a response time.

In the above-mentioned Embodiment 2, the step-down type converter which has a synchronous rectifying capability is used in the DC-DC converter, a DC-DC converter according to the present invention is not limited to such a structure. The present invention is applicable also to DC-DC converters having a synchronous rectifying capability of all of a step-down type, a step-up type and a step-up/step-down type.

Embodiment 3

Figure 6:
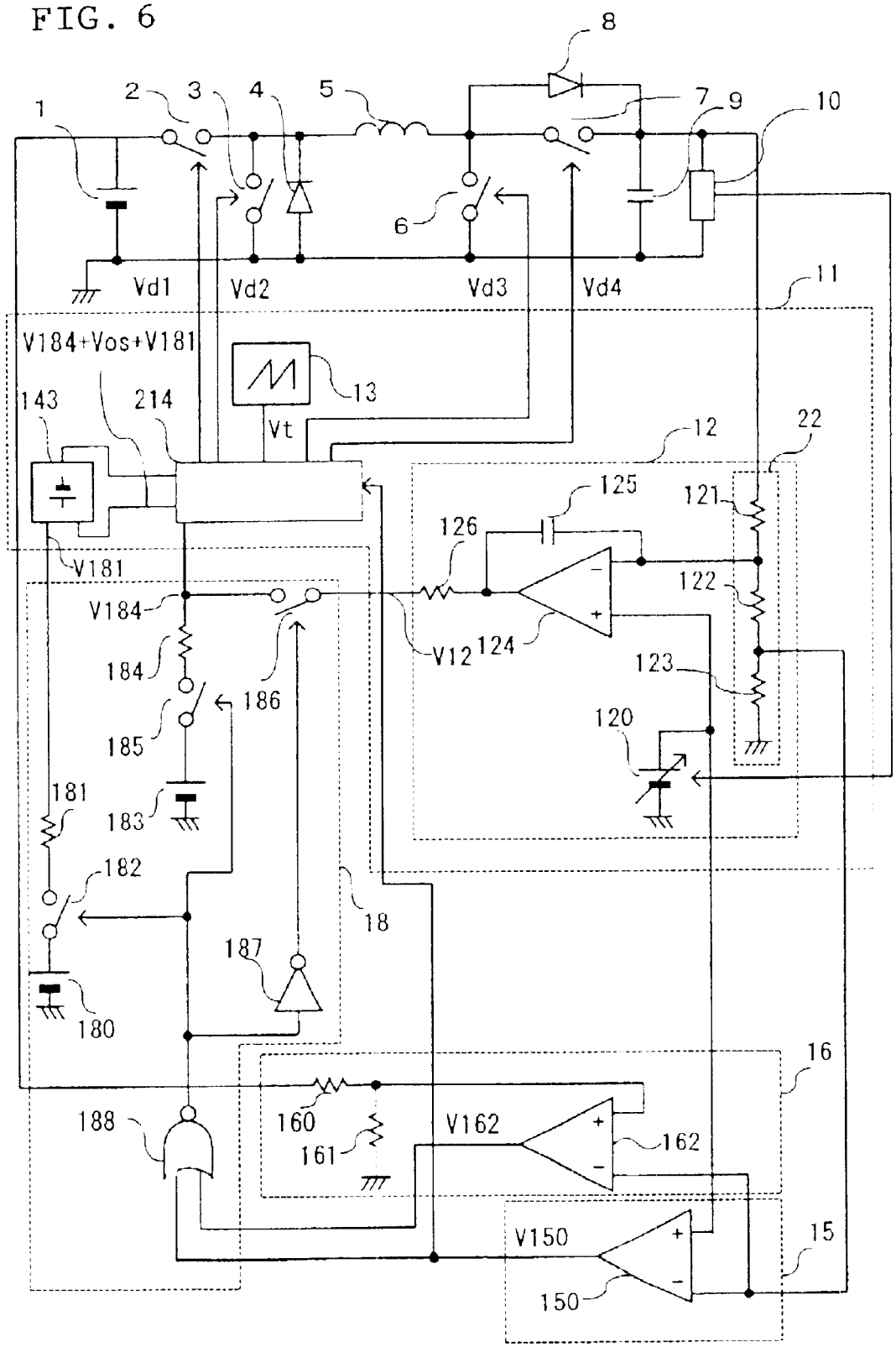
FIG. 6 is a circuitry diagram which shows a structure of a DC-DC converter according to a third preferred embodiment of the present invention.

A DC-DC converter of Embodiment 3 according to the present invention will be described below with reference to FIG. 6 through FIG. 9. FIG. 6 is a circuitry diagram showing a structure of a DC-DC converter of Embodiment 3 of the present invention. In the DC-DC converter of Embodiment 3, parts and elements having substantially the same functions and structures as those of the DC-DC converter of Embodiment 1 are denoted by the same reference numerals and description thereof are omitted.

As shown in FIG. 6, the DC-DC converter of Embodiment 3 comprises the input DC source 1 which outputs the input DC voltage Vi, and one end of the first switch 2 which is a main switch circuit is connected to one end of the input DC source 1. The other end of the first switch 2 is connected to one end of the second switch 3, the cathode of the first diode 4 and one end of the inductor 5. The other end of the second switch 3 and the anode of the first diode 4 are connected to the other end of the input DC source 1. The first switch 2 and the second switch 3 which are connected in this manner repeatedly turn on and off in response to a drive control signal fed from the control part 11. The control part 11 is connected to the output power dive detecting circuit 15 which detects a time at which an output power dive state occurs.

As shown in FIG. 6, the DC-DC converter of Embodiment 3 comprises a third switch 6 which connects one end of the inductor 5 to the ground and a fourth switch 7 which connects one end of the inductor 5 to one end of the output capacitor 9. A second diode 8 is connected in parallel across the both ends of the fourth switch 7 so that a direction toward the load side is a forward direction. In response to the drive control signal fed from the control part 11, the third switch 6 and the fourth switch 7 repeatedly turn on and off.

The DC-DC converter of Embodiment 3 further comprises an input/output comparison circuit 16 and a second transient response operation circuit 18. The input/output comparison circuit 16 receives the input DC voltage Vi from the input DC source 1 and a detection signal which is the same as a detection signal which is fed to the output power dive detecting circuit 15. The second transient response operation circuit 18 receives an output signal from the output power dive detecting circuit 15 and an output signal from the error amplifying circuit 12.

In the DC-DC converter of Embodiment 3, the first switch 2, the inductor 5 and the third switch 6 are connected in series. When the first switch 2 and the third switch 6 both turn on, the input DC voltage Vi is applied upon the inductor 5. Further, the second switch 3, the inductor 5 and the fourth switch 7 are connected in series. When the second switch 3 and the fourth switch 7 both turn on, a voltage from the inductor 5 is applied upon the output capacitor 9.

The control part 11 comprises the error amplifying circuit 12, the oscillating circuit 13, a control circuit 214 and an adder 143. In order to control the output DC voltage Vo, the control part 11 exhibits a function of controlling turning on and off of each one of the first switch 2, the second switch 3, the third switch 6 and the fourth switch 7.

The DC-DC converter of Embodiment 3 having such a structure as above is a step-up/step-down converter (a step-up/step-down converter). The DC-DC converter converts the input DC voltage Vi from the input DC source 1 into a desired DC voltage and outputs the desired DC voltage.

Figure 7:
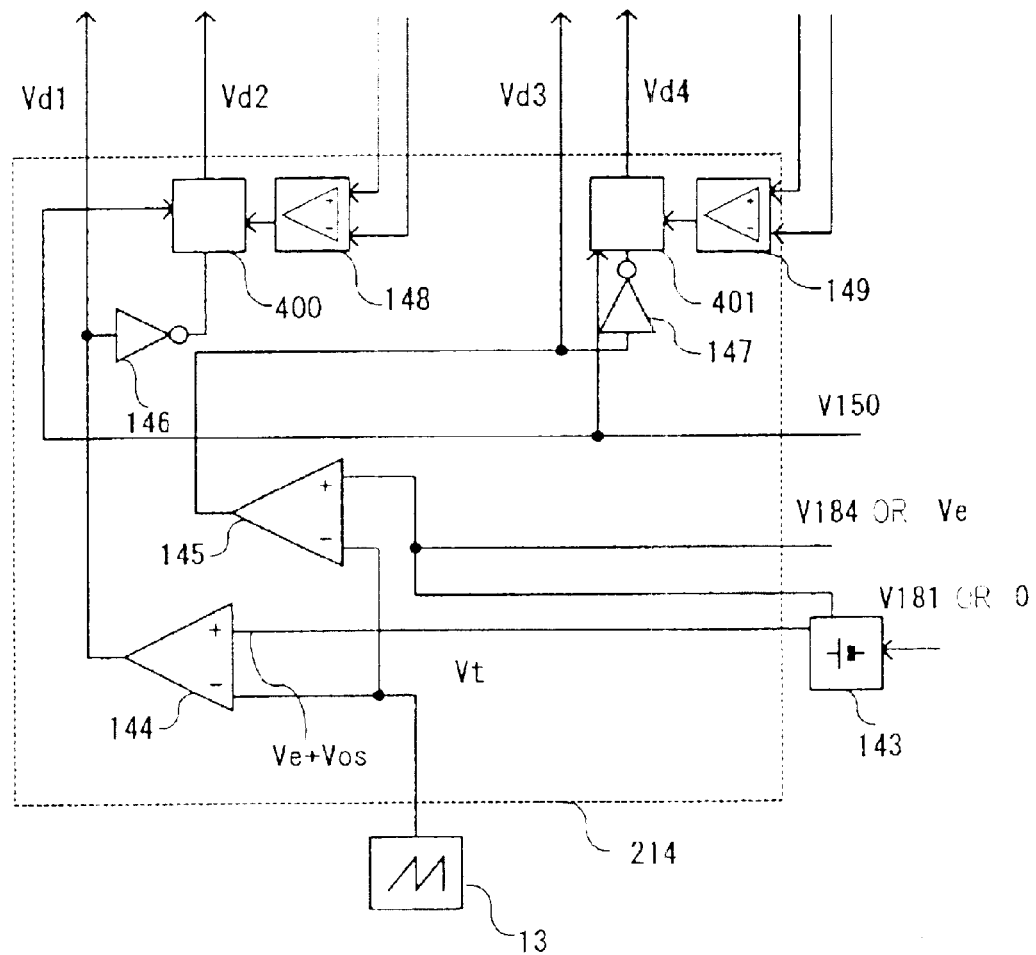
FIG. 7 is a circuitry diagram which shows a structure of a control part in the DC-DC converter of Embodiment 3.

FIG. 7 is a circuitry diagram showing a structure of the control circuit 214.

As shown in FIG. 7, the error voltage Ve fed to the control circuit 214 is supplied to a second comparator 145 and further to a first comparator 144 via the adder 143. The adder 143 adds an offset voltage Vos to the error voltage Ve, and outputs a signal (Ve+Vos) to the first comparator 144. The first comparator 144 compares the output (Ve+Vos) from the adder 143 with the saw-tooth shape voltage Vt. The second comparator 145 compares the error voltage Ve with the saw-tooth shape voltage Vt.

The output voltage Vd1 from the first comparator 144 becomes a first drive signal which is for controlling turning on and off of the first switch 2. An output of the first comparator 144 is fed to a first synchronous switch driving circuit 400 via a first inverter 146 which reverses an inputted signal. An output voltage Vd2 from the first synchronous switch driving circuit 400 becomes a second drive signal which is for controlling turning on and off of the second switch 3.

An output voltage Vd3 from the second comparator 145 becomes a third drive signal which is for controlling turning on and off of the third switch 6. An output from the second comparator 145 is fed to a second synchronous switch driving circuit 401 via a second inverter 147 which reverses an inputted signal. An output voltage Vd4 from the second synchronous switch driving circuit 401 becomes a fourth drive signal which is for controlling turning on and off of the fourth switch 7.

As shown in FIG. 7, a first light load detecting circuit 148 receives a signal line which is connected to the both ends of the second switch 3, and a second light load detecting circuit 149 receives a signal line which is connected to the both ends of the fourth switch 7. The first light load detecting circuit 148 detects a current value using an ON-state resistance of the second switch 3 and the second light load detecting circuit 149 detects a current value using an ON-state resistance of the fourth switch 7. Based on these current values, the first light load detecting circuit 148 and the second light load detecting circuit 149 detect a light load state. In other words, the first light load detecting circuit 148 determines as a light load state, when a current flowing through the second switch 3 in an ON-state exceeds a predetermined value. At this time, since the output power dive detecting circuit 15 has not detected an output power dive state, the first synchronous switch driving circuit 400 turns off the second switch 3. This operation is an operation in the discontinuous operation mode which is one of operations in the standby operation mode and which controls such that a backward current will not flow. The second light load detecting circuit 149 determines as a light load state, when a current flowing through the fourth switch 7 exceeds a predetermined value. Since the output power dive detecting circuit 15 has not detected an output power dive state at this time, the second synchronous switch driving circuit 401 turns off the fourth switch 7. This operation, too, is an operation in the discontinuous operation mode which is one of operations in the standby operation mode and which controls such that a backward current will not flow.

The output power dive detecting circuit 15 comprises the comparator 150. The input/output comparison circuit 16 comprises a resistor 160, a resistor 161 and a comparator 162. The second transient response operation circuit 18 comprises a first instruction voltage source 180, a resistor 181, a switch 182, a second instruction voltage source 183, a resistor 184, a switch 185, a switch 186, an inverter 187 and an NOR circuit 188.

Operations of the DC-DC converter of Embodiment 3 having the above-mentioned configuration will be described below.

First, a normal operation mode, which is an operation mode in a heavy load state, of the DC-DC converter of Embodiment 3 will be described.

In the normal operation mode, the control part 11 makes the first switch 2, the second switch 3, the third switch 6 and the fourth switch 7 have the same switching cycle T and turn on and off. A ratio of ON-periods of the first switch 2 and the third switch 6 to one switching cycle T, namely, duty ratios are set respectively to δ1 and δ2. Further, δ1>δ2 is ensured so that the first switch 2 becomes as well ON without fail when the third switch 6 is ON. The second switch 3 becomes OFF when the first switch 2 is ON, and the second switch 3 becomes ON when the first switch 2 is OFF. The fourth switch 7 becomes OFF when the third switch 6 is ON, and the fourth switch 7 becomes ON the third switch 6 is OFF.

First, when the first switch 2 and the third switch 6 are both ON, the input DC voltage Vi from the input DC source 1 is applied upon the inductor 5. A relationship δ2·T holds during this period. At this time, a current flows in the inductor 5 from the input DC source 1, and magnetic energy accumulates in the inductor 5. The fourth switch 7 then becomes ON as the third switch 6 becomes OFF, and a difference Vi−Vo between the input DC voltage Vi and the output DC voltage Vo is applied upon the inductor 5. A relationship (δ1−δ2)·T holds during this period, and a current flows to the output capacitor 9 from the input DC source 1 via the inductor 5. At last, when the first switch 2 and the third switch 6 are both OFF, the second switch 3 and the fourth switch 7 both turn on and the output DC voltage Vo is applied upon the inductor 5 in the reverse direction. A relationship (1−δ1)·T holds during this period. A current therefore flows to the output capacitor 9 from the inductor 5, and the accumulated magnetic energy is released.

The magnetic energy is accumulated and released repeatedly in the inductor 5 as mentioned above. As a result, electric power is supplied from the output capacitor 9 to the load 10. In a stable operation state that accumulation of magnetic energy in the inductor 5 and release of magnetic energy from the inductor 5 are in balance, the sum of the two products of the voltages and the time periods is zero. Therefore, the following formula (4) is satisfied, whereby such a conversion characteristic is obtained that the output DC voltage Vo stays as expressed by the formula (5) below with respect to the input DC voltage Vi.

When δ2=0 holds, too, the output DC voltage Vo satisfies the formula (6) below in a similar manner, and a step-down type converter operation is realized.

When δ1=1 holds, too, the output DC voltage Vo satisfies the formula (7) below in a similar manner, and a step-up type converter operation is realized. In addition, with duty ratios of the respective switches controlled, it is possible to set δ1/(1−δ2) to zero through infinity. That is, the DC-DC converter of Embodiment 3 operates as a step-up/step-down converter which, in theory, is capable of generating any desirable output DC voltage Vo from any desirable input DC voltage Vi.

$$Vi·δ2·T+(Vi-Vo)(δ1-δ2)T=Vo(1-δ1)T \quad (4)$$

$$Vo=[δ1/(1-δ2)]Vi \quad (5)$$

$$Vo=δ1·Vi \quad (6)$$

$$Vo=[1/(1-δ2)]Vi \quad (7)$$

The error voltage Ve outputted from the error amplifying circuit 12 decreases when a voltage detected by the detecting circuit 22 using resistance from the output DC voltage Vo becomes higher than the reference voltage from the reference voltage source 120. When the voltage detected using resistance becomes lower than the reference voltage from the reference voltage source 120, the error voltage Ve increases. In other words, when the input DC voltage Vi becomes high or the output DC voltage Vo tries to increase as the load 10 becomes light, the error voltage Ve decreases. On the contrary, when the input DC voltage Vi becomes low or the output DC voltage Vo tries to decrease as the load 10 becomes heavy, the error voltage Ve increases.

Figure 8:
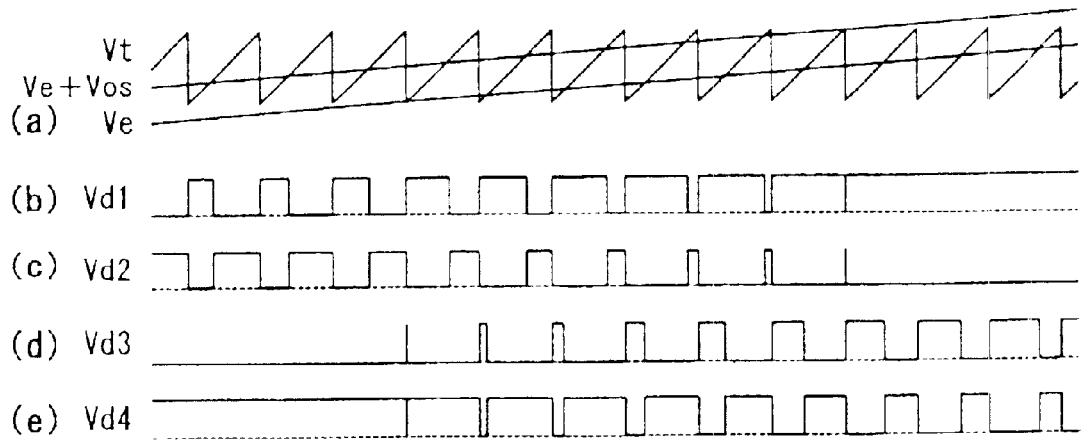
FIG. 8 is a waveform diagram which shows an operation of the control part in the DC-DC converter of Embodiment 3.

FIG. 8 shows signal waveforms in respective portions of the control part 11 in the DC-DC converter of Embodiment 3. In FIG. 8, a part (a) shows the saw-tooth shape voltage Vt, the error voltage Ve and an output voltage (Ve+Vos) from the adder 143, a part (b) shows the first drive signal Vd1, a part (c) shows the second drive signal Vd2, a part (d) shows the third drive signal Vd3, and a part (e) shows the fourth drive signal Vd4. In FIG. 8, a left-hand side portion represents a state that (saw-tooth shape voltage Vt)>(error voltage Ve) holds, a central portion represents a state that the saw-tooth shape voltage Vt, the error voltage Ve and the output voltage (Ve+Vos) from the adder 143 intersect, and a right-hand side portion represents a state that (saw-tooth shape voltage Vt)<(output voltage (Ve+Vos) from the adder 143)) holds.

Operations of the DC-DC converter of Embodiment 3 will be described with reference to FIG. 8 below.

First, when the input DC voltage Vi is high and (saw-tooth shape voltage Vt)>(error voltage Ve) holds (the left-hand side portion in FIG. 8), the third drive signal Vd3 which is an output from the second comparator 145 is always "L" and the third switch 6 turns off. Therefore, the duty ratio δ2 of the third switch 6 is δ2=0. On the other hand, the first switch 2 is driven to turn on and off in accordance with the first drive signal Vd1 which is an output from the first comparator 144. The ratio δ1 at this stage becomes smaller as the error voltage Ve decreases. In this case, the DC-DC converter operates as a step-down converter whose input voltage/output voltage relationship is expressed by the formula (6).

Next, as shown in the central portion in FIG. 8, when the input DC voltage Vi is in the vicinity of the output DC voltage Vo and when the saw-tooth shape voltage Vt, the error voltage Ve and the output voltage (Ve+Vos) from the adder 143 intersect, the first switch 2 is driven to turn on and off in accordance with the first drive signal Vd1 which is an output from the first comparator 144. And, the third switch 6 is driven to turn on and off in accordance with the third drive signal Vd3 which is an output from the second comparator 145. The duty ratios δ1 and δ2 at this time become smaller as the error voltage Ve decreases. In this case, the DC-DC converter operates as a step-up/step-down converter whose input voltage/output voltage relationship is expressed by the formula (5).

Next, as shown in the right-hand side portion in FIG. 8, when the input DC voltage Vi is low and (saw-tooth shape voltage Vt)<(output voltage (Ve+Vos) from the adder 143)) holds (the right-hand side portion in FIG. 8), the first drive signal Vd1 which is an output from the first comparator 144 is always "H" and the first switch 2 turns on. Therefore, the duty ratio δ1 of the first switch 2 satisfies δ1=1. The third switch 6 is driven to turn on and off in accordance with the third drive signal Vd3 which is an output from the second comparator 145. The ratio δ2 at this time becomes larger the error voltage Ve increases. In this case, the DC-DC converter operates as a step-up converter whose input voltage/output voltage relationship is expressed by the formula (7).

This is the normal operation mode in the DC-DC converter of Embodiment 3 of the present invention. Assuming that the resistance values of the resistor 160 and the resistor 161 are respectively R160 and R161, the following formula (8) and (9) are satisfied, since the comparator 162 compares the input DC voltage Vi with the output DC voltage Vo.

$$R160=R121+R122 \tag{8}$$

$$R161=R123 \tag{9}$$

Hence, when the input DC voltage Vi is higher that the output DC voltage Vo, the comparator 162 outputs "H". When the input DC voltage Vi is lower than the output DC voltage Vo, the comparator 162 outputs "L".

An operation mode at the time of a transient response (transient response operation mode) in the DC-DC converter of Embodiment 3 will be described below with reference to FIG. 9.

Figure 9:
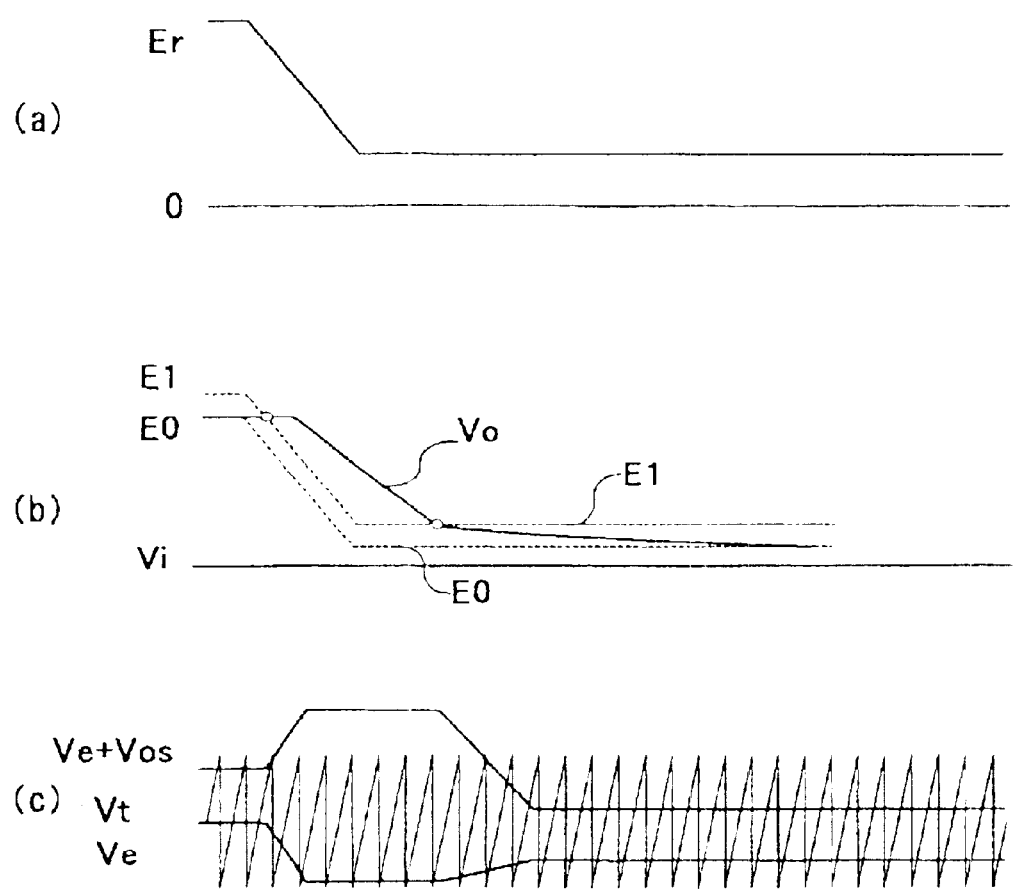
FIG. 9 is a waveform diagram which shows operations in respective portions of the DC-DC converter of Embodiment 3.

FIG. 9 shows signal waveforms in the respective portions of the DC-DC converter of Embodiment 3 when the reference voltage Er sharply drops. In FIG. 9, a part (a) shows voltage waveforms upon a sharp drop in reference voltage Er, a part (b) shows a waveform diagram showing a relationship among the target output voltage E0, the upper limit output voltage E1, the input DC voltage Vi and the output DC voltage Vo in a situation shown in the part (a). A part (c) of FIG. 9 shows the saw-tooth shape voltage Vt, the error voltage Ve and the output (Ve+Vos) from the adder 143.

During a period that the output DC voltage Vo is higher than the upper limit output voltage E1, the drive voltage V150 outputted from the comparator 150 is "L." Further, since the input DC voltage Vi is lower than the output DC voltage Vo, a drive voltage V162 from a comparator 162 is "L."

When the NOR circuit 188 receives the drive voltage V150 of the comparator 150 and the drive voltage V162 of the comparator 162, the NOR circuit 188 becomes "H" and the switch 182 and the switch 185 turn on. A drive voltage V188 of the NOR circuit 188 is reversed by the inverter 187, and therefore, the switch 186 turns off.

Turning off of the switch 186 gives rise to a state that the output V12 from the error amplifying circuit 12 is not transmitted to the control circuit 14. Further, as the switch 185 turns on, a voltage (instruction voltage V184) from the second instruction voltage source 183 is supplied to the control circuit 214 via the resistor 184. When the switch 182 turns on, a voltage (instruction voltage V181) from the first instruction voltage source 180 is supplied to the adder 143 via the resistor 181. An output from the adder 143 therefore becomes "V184+Vos+V181." The voltage value of the instruction voltage V184 is set to be slightly larger than the minimum value of the saw-tooth shape voltage Vt, and the voltage value of the instruction voltage V181 is set such that the voltage (V184+Vos+V181) becomes larger than the maximum value of the saw-tooth shape voltage Vt.

In the operation described above, during one switching cycle, the first switch 2 is always ON, the second switch 3 is always OFF, the third switch 6 is ON for only a very short period, and the fourth switch 7 is OFF for only a very short period. A relationship δ1=1, δ2 realizes an operation as a step-up converter which controls at a small duty ratio. This state continues until the comparator 150 is reversed and the switch 186 accordingly turns on. Following this, the normal operation mode or the standby operation mode starts again, and the output DC voltage Vo settles at the target output voltage E0 before long. When the switch 186 turns on, the resistor 126 restricts a current which flows in the phase compensating capacitor 125 and suppresses a variation in detected voltage.

As described above, when the output DC voltage Vo is higher than the input DC voltage Vi, until the upper limit output voltage E1 is reached, the DC-DC converter of Embodiment 3 continues the operation that electric power which is regenerated by the power regenerating operation exceeds electric power which is regenerated by such a power regenerating operation in which the error voltage is not forcibly changed. Therefore, the DC-DC converter of Embodiment 3 can shorten a response time.

Figure 19:
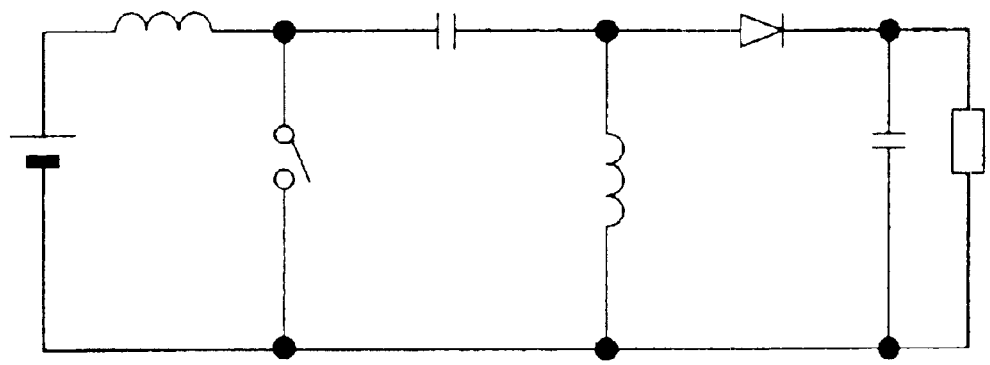
FIG. 19 is a circuitry diagram of a SEPIC which is a DC-DC converter which has a step-up/step-down capability.
Figure 20:
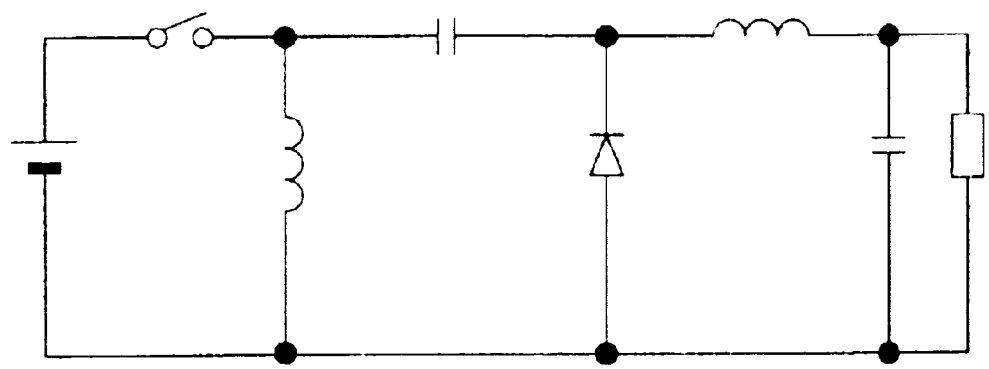
FIG. 20 is a circuitry diagram of a Zeta converter which is a DC-DC converter which has a step-up/step-down capability.

In the above-mentioned Embodiment 3, the 4-chip type converter as the step-up/step-down converter is used in the DC-DC converter, a DC-DC converter according to the present invention is not limited to such a structure. Among others, a SEPIC shown in the circuitry diagram in FIG. 19, a Zeta converter shown in the circuitry diagram in FIG. 20 are known as a step-up/step-down converters. Alternatively, the present invention can be realized by combining a step-up converter and a step-down converter in series or parallel. The present invention is applicable to all such step-up/step-down type DC-DC converters having a synchronous rectifying capability.

Further, although the four switches are driven under control during a step-up/step-down operation in the DC-DC converter of Embodiment 3, since the drive control can use only two switches during a step-up operation, a switching loss greatly decreases, which in turn realizes a highly efficient DC-DC converter.

Embodiment 4

Figure 10:
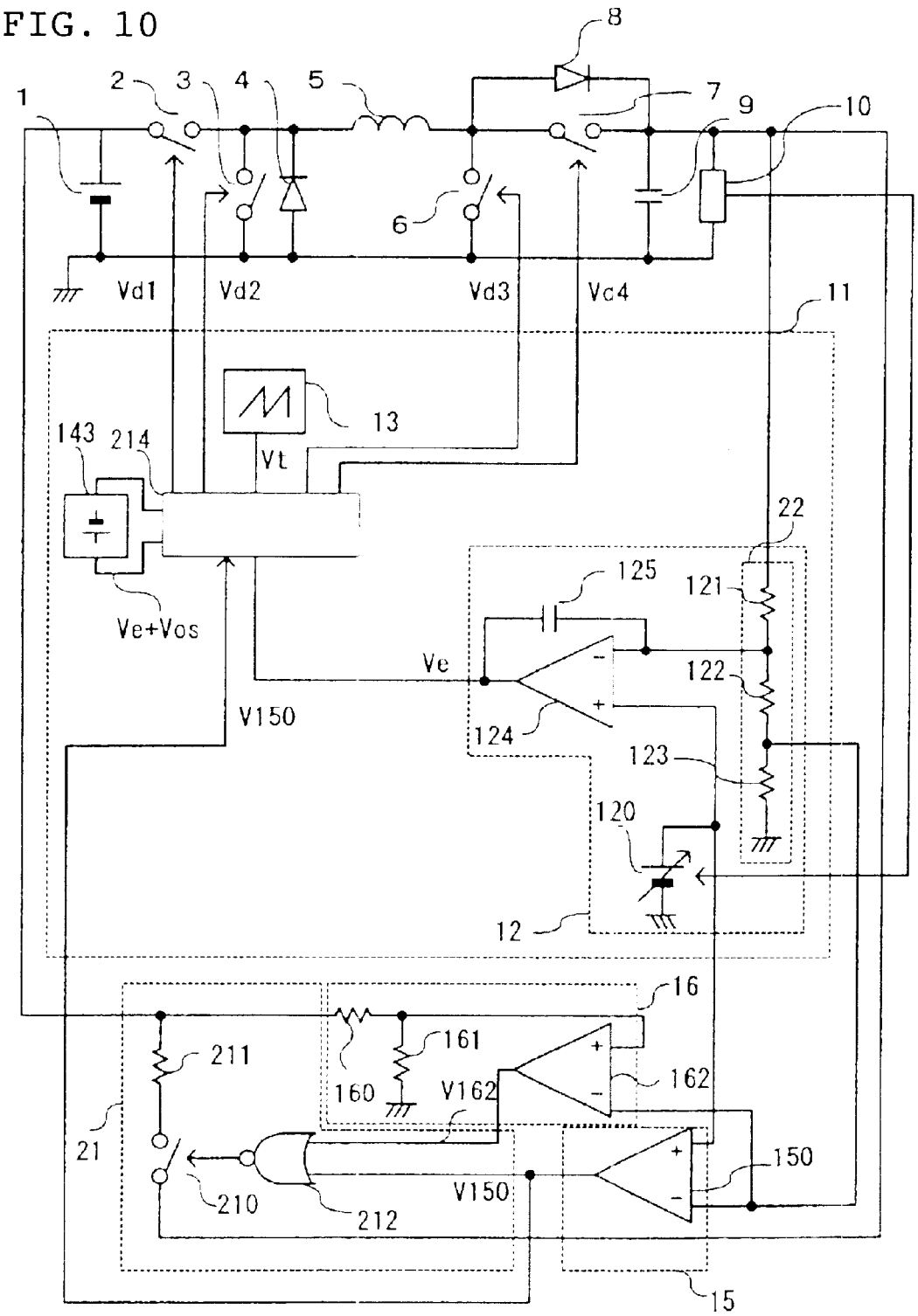
FIG. 10 is a circuitry diagram which shows a structure of a DC-DC converter according to a fourth preferred embodiment of the present invention.

A DC-DC converter according to Embodiment 4 according to the present invention will be described below with reference to FIG. 10 and FIG. 11. FIG. 10 is a circuitry diagram showing a structure of the DC-DC converter of Embodiment 4 according to the present invention. In the DC-DC converter of Embodiment 4, parts and elements having substantially the same functions and structures to those of the DC-DC converter of Embodiment 3 are denoted by the same reference numerals and description thereof are omitted.

The DC-DC converter of Embodiment 4 is different from the DC-DC converter of Embodiment 3 shown in FIG. 6 in that there is a high-speed response circuit 21 comprising a regeneration switch 210, a resistor 211 and an NOR circuit 212, and the second transient response operation circuit 18 is deleted.

An operation mode at the time of a transient response (transient response operation mode) in the DC-DC converter of Embodiment 4 will be described below with reference to FIG. 11 and FIG. 12. In FIG. 11, a part (a) shows voltage waveforms when a reference voltage Er sharply drops, a part (b) shows a waveform diagram showing a relationship among the target output voltage E0, the upper limit output voltage E1, the input DC voltage Vi and the output DC voltage Vo in a situation shown in the part (a). A part (c) of FIG. 11 shows a voltage waveform (V212) in the high-speed response circuit 21.

Figure 11:
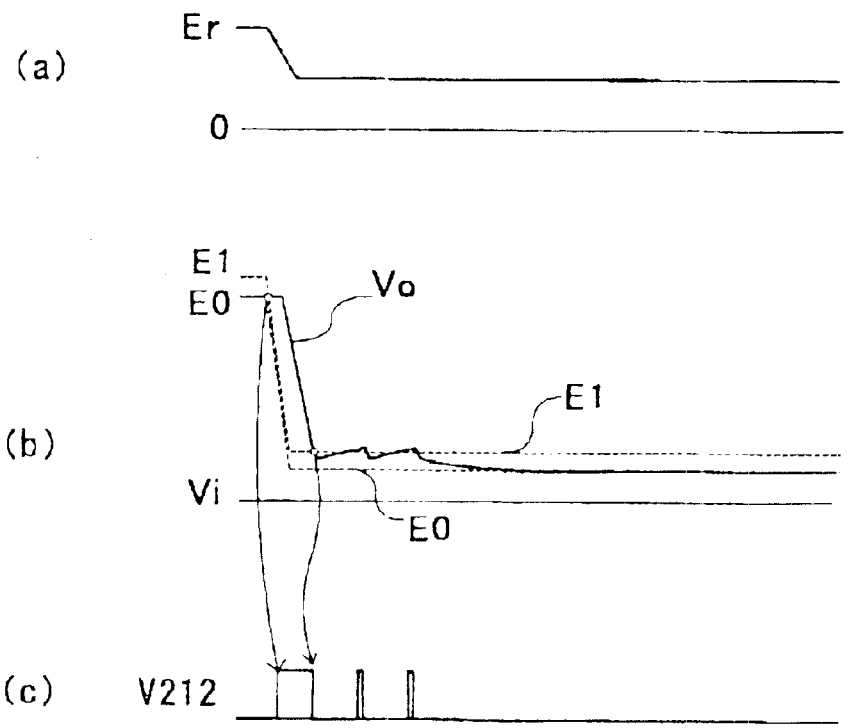
FIG. 11 is a waveform diagram which shows operations in respective portions of the DC-DC converter of Embodiment 4.

The voltage waveform of the reference voltage Er shown in the part (a) of FIG. 11 represents a state that the reference voltage Er has sharply dropped in response to an instruction from the load 10 or the like. The upper limit output voltage E1 due to the dropped reference voltage Er shown in the part (a) of FIG. 11 is higher than the input DC voltage Vi. The target output voltage E0 and the upper limit output voltage E1, too, change as the reference voltage Er changes. But the error amplifier 124 of the error amplifying circuit 12 does not response instantly and the error voltage Ve and the voltage (Ve+Vos), which is obtained by adding the offset voltage Vos to the error voltage Ve, gradually decrease. The voltage (Ve+Vos) is generated in the adder 143 and outputted to the first comparator 144.

In the state shown in FIG. 11, the comparator 150 of the output power dive detecting circuit 15 outputs "L" to the high-speed response circuit 21 since the detected voltage is higher than the reference voltage Er. The comparator 162 of the input/output comparison circuit 16 outputs "L" to the NOR circuit 212 of the high-speed response circuit 21 since the output DC voltage Vo is higher than the input DC voltage Vi. Therefore, the drive signal V212 for the regeneration switch 210 outputted from the NOR circuit 212 becomes "H" and the regeneration switch 210 turns on. As a result, power is rapidly regenerated from the output capacitor 9 to the input DC source 1 via the high-speed response circuit 21. Turning on of the regeneration switch 210 continues until the output DC voltage Vo reaches the upper limit output voltage E1 and the comparator 150 is reversed.

When the error voltage Ve is yet to sufficiently decrease after reversing of the comparator 150 and turning off of the regeneration switch 210, the output DC voltage Vo increases and the regeneration switch 210 turns on again. The output DC voltage Vo decreases again and the regeneration switch 210 turns off again. As the regeneration switch 210 turns on and off repeatedly, the error voltage Ve sufficiently increases and the output DC voltage Vo settles at the target output voltage E0.

Figure 12:
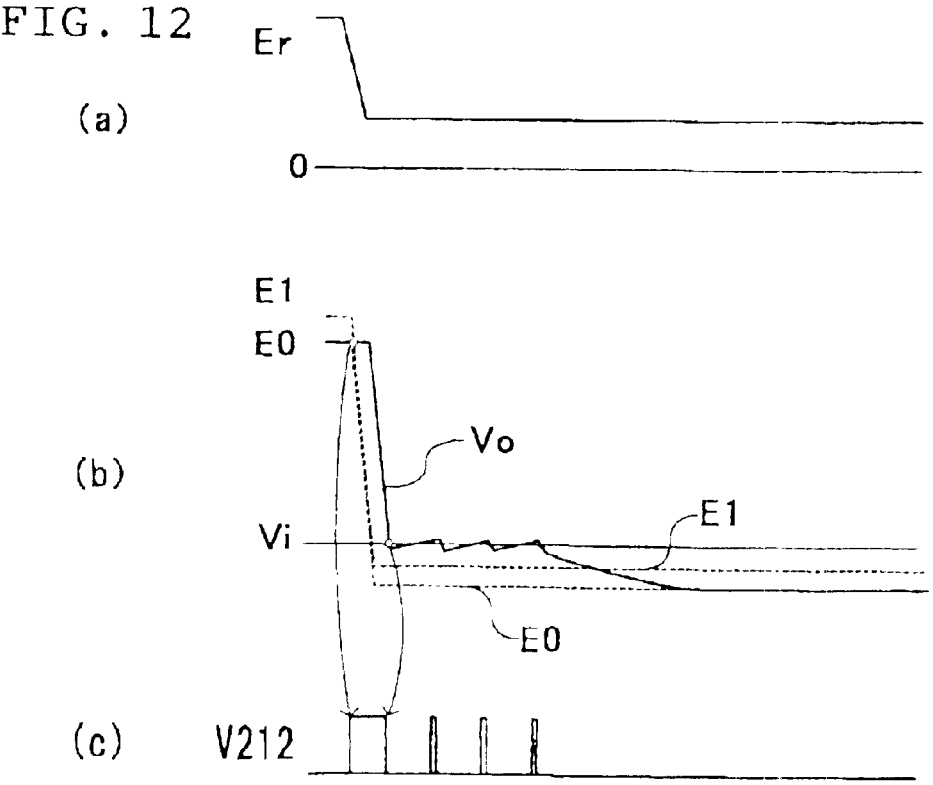
FIG. 12 is a waveform diagram which shows operations in respective portions of the DC-DC converter of Embodiment 4.

FIG. 12 is a waveform diagram which shows a state that the reference voltage Er has further dropped largely and the upper limit output voltage E1 as it is after the drop in the reference voltage Er becomes lower than the input DC voltage Vi. A part (a) of FIG. 12 shows voltage waveforms upon a substantial and sharp drop in reference voltage Er, a part (b) of FIG. 12 shows a waveform diagram showing a relationship among the target output voltage E0, the upper limit output voltage E1, the input DC voltage Vi and the output DC voltage Vo in a situation shown in the part (a), and a part (c) of FIG. 12 shows the voltage waveform (V212) in the high-speed response circuit 21.

The target output voltage E0 and the upper limit output voltage E1, too, change as the reference voltage Er, changes. But the error amplifier 124 does not response instantly and the error voltage Ve and the voltage (Ve+Vos), which is obtained by adding the offset voltage Vos to the error voltage Ve, gradually decrease.

In the state shown in FIG. 12, the comparator 150 of the output power dive detecting circuit 15 outputs "L" to the high-speed response circuit 21 since the detected voltage is higher than the reference voltage Er. The comparator 162 of the input/output comparison circuit 16 outputs "L" to the NOR circuit 212 of the high-speed response circuit 21 since the output DC voltage Vo is higher than the input DC voltage Vi. Therefore, the drive signal V212 for the regeneration switch 210 outputted from the NOR circuit 212 becomes "H" and the regeneration switch 210 turns on. As a result, power is rapidly regenerated from the output capacitor 9 to the input DC source 1 via the high-speed response circuit 21. Turning on of the regeneration switch 210 continues until the output DC voltage Vo reaches the input DC voltage Vi and the comparator 150 is reversed.

When the error voltage Ve is yet to sufficiently decrease after reversing of the comparator 150 and turning off of the regeneration switch 210, the output DC voltage Vo increases and the regeneration switch 210 turns on again. The output DC voltage Vo decreases again and the regeneration switch 210 turns off again. As the regeneration switch 210 turns on and off repeatedly, the error voltage Ve sufficiently increases before long and the output DC voltage Vo settles at the target output voltage E0.

In Embodiment 4, the upper limit output voltage E1 is set preferably to a value which is close to the target output voltage E0 and which is the same or higher than an upper tolerance value of the output DC voltage Vo. The resistance value R161 is preferably set with consideration given to voltage drops at the regeneration switch 210 and the resistor.

In the conventional DC-DC converter, the output DC voltage Vo changes in accordance with a gradual change in error voltage Ve which is determined by the response speed of the error amplifier. And the response speed at which the output DC voltage Vo reaches the target output voltage E0 is very slow.

In contrast, the DC-DC converter of Embodiment 4, performing a quick power regenerating operation by using the high-speed response circuit 21 having the regeneration switch 210, remarkably shortens a response time. Further, since the regeneration switch 210 remains turned on until the output DC voltage Vo reaches the higher one of the upper limit output voltage E1 and the input DC voltage Vi and then returns to the normal response operation, the output DC voltage Vo will not undershoot.

In the DC-DC converter of Embodiment 4, the resistor 211 of the high-speed response circuit 21 is for restricting a regenerative current during rapid power regeneration due to the regeneration switch 210 from the input DC source 1 to the output capacitor 9. However, the resistor 211 can be replaced with an impedance which develops when the regeneration switch 210 itself stays turned on. In the above-mentioned Embodiment 4, the 4-chip type converter as the step-up/step-down converter is used in the DC-DC converter, a DC-DC converter according to the present invention is not limited to such a structure. Among others, a SEPIC shown in the circuitry diagram in FIG. 19, a Zeta converter shown in the circuitry diagram in FIG. 20 are known as a step-up/step-down converters. Alternatively, the present invention can be realized by combining a step-up converter and a step-down converter in series or parallel. The present invention is applicable also to such step-up/step-down type DC-DC converters. And the DC-DC converter of Embodiment 4 has been described as a step-up/step-down converter, the structure according to Embodiment 4 can be applied to a step-up converter as well.

Embodiment 5

Figure 13:
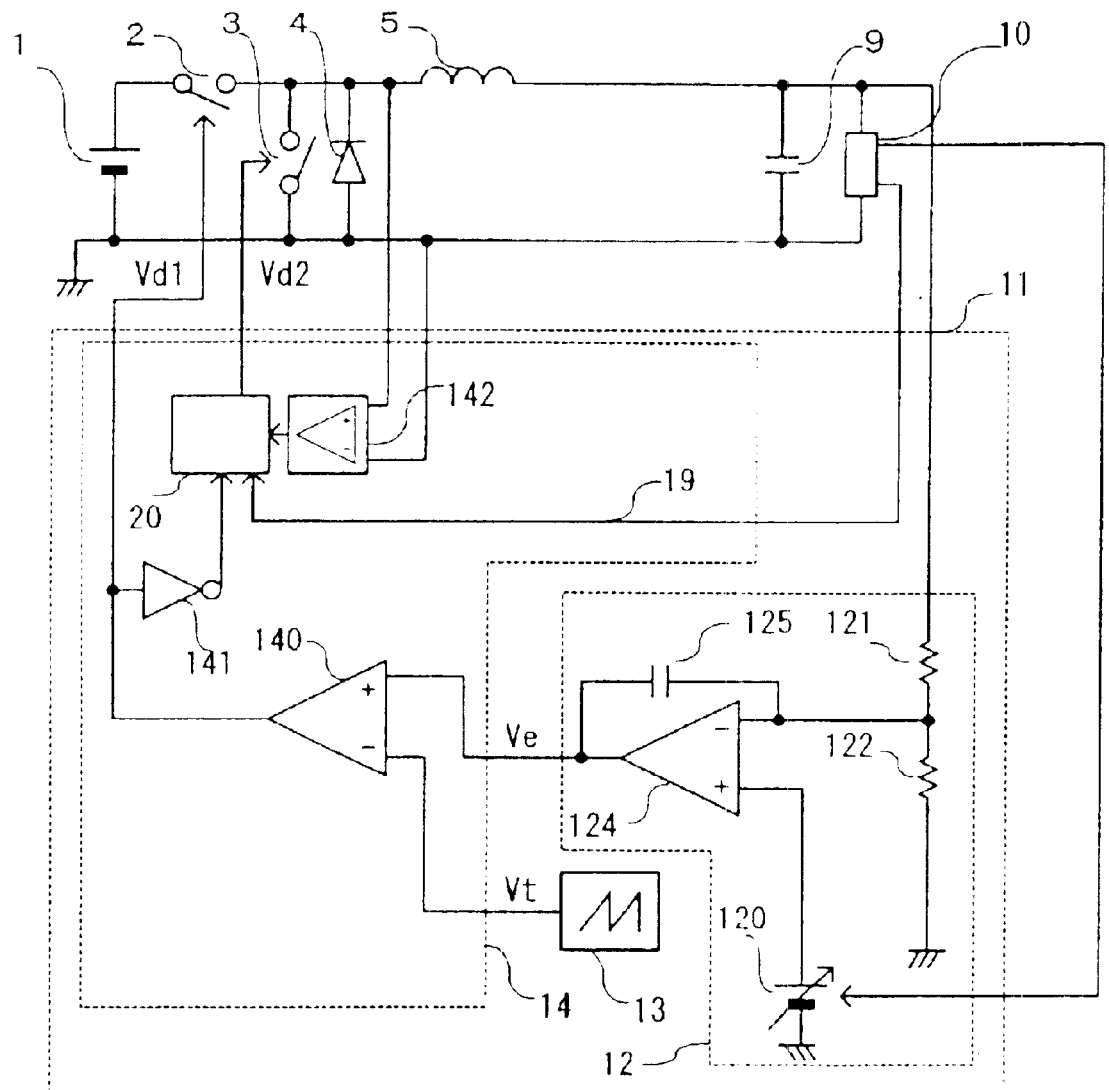
FIG. 13 is a circuitry diagram which shows a structure of a DC-DC converter according to a fifth preferred embodiment of the present invention.
Figure 14:
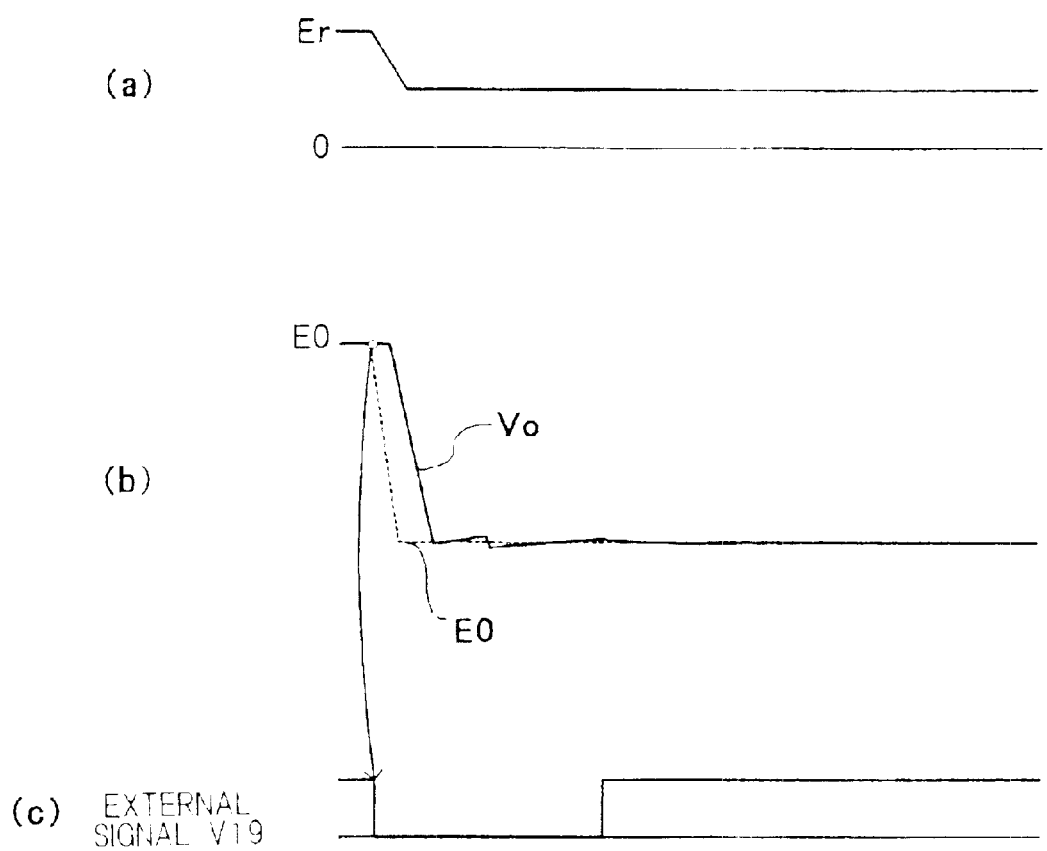
FIG. 14 is a waveform diagram which shows operations in respective portions of the DC-DC converter of Embodiment 5.

A DC-DC converter Embodiment 5 according to the present invention will be described below with reference to FIG. 13 and FIG. 14. FIG. 13 is a circuitry diagram showing a structure of the DC-DC converter of Embodiment 5 according to the present invention. In the DC-DC converter of Embodiment 5, parts and elements having substantially the same functions and structures to those of the DC-DC converter of Embodiment 1 are denoted by the same reference numerals and description thereof are omitted.

The DC-DC converter of Embodiment 5 is different from the DC-DC converter of Embodiment 1 shown in FIG. 1 in that there is no output power dive detecting circuit (15) and that the DC-DC converter receives an external signal 19 which is fed from an external apparatus such as the load 10 and which is indicative of an output power dive state. Embodiment 1 demands that the output power dive detecting circuit (15) detects an output power dive state, in the DC-DC converter of Embodiment 5, the control part 11 is provided with the external signal 19 which is fed from an external apparatus and which is indicative of an output power dive state, and the light load detecting circuit 142 of the control part 11 and the synchronous switch driving circuit 20 perform the same operations as those described earlier in relation to Embodiment 1. Therefore, the DC-DC converter of Embodiment 5 permits a simplification of the circuit structure.

Further, according to Embodiment 1, since the output power dive detecting circuit (15) is used, when the load is light, the operation in the continuous operation mode (power regenerating operation) and the operation in the discontinuous operation mode are repeated until the error voltage Ve sufficiently decreases and the output DC voltage Vo settles at the target output voltage E0. Thus, it takes a while until the output DC voltage Vo settles at the target output voltage E0. In the DC-DC converter of Embodiment 5, the external signal 19 which is indicative of an output power dive state is used. As a power regenerating operation is executed while inputting of the external signal 19 is continued until the error voltage Ve sufficiently decreases and the output DC voltage Vo settles at the target output voltage E0, a response time is shortened.

An operation mode at the time of a transient response (transient response operation mode) in the DC-DC converter of Embodiment 5 will be described below with reference to FIG. 14. In FIG. 14, a part (a) shows voltage waveforms when a reference voltage Er sharply drops, a part (b) shows a waveform diagram showing a relationship between the target output voltage E0 and the output DC voltage Vo in a situation shown in the part (a). A part (c) of FIG. 14 shows a voltage waveform (V19) of the external signal 19.

First, a situation that the load 10 is always in a light load state will be described.

Since there is already a light load state even before the reference voltage Er drops, the external signal 19 does not provide a signal which is indicative of an output power dive state, and the light load detecting circuit 142 has detected the light load state. Hence, the synchronous switch driving circuit 20 turns off the second switch 3. The DC-DC converter at this time is operating in the discontinuous operation mode which is one of standby operation modes. In this condition, that is, in this light load state prior to a drop in reference voltage Er, the external signal 19 is outputting "H."

When the reference voltage Er sharply drops, the target output voltage E0 decreases, the external signal 19 becomes "L" and a signal which is indicative of an output power dive state is fed, and the light load detecting circuit 142 detects a light load. In consequence, the synchronous switch driving circuit 20 accepts the drive voltage V141 from the inverter 141 as it directly is as the drive voltage Vd2 from the second switch 3. In this fashion, the discontinuous operation mode which is a standby operation mode does not change during inputting of the external signal 19 of "L," and the operation in the continuous operation mode remains. Hence, during this period, the output DC voltage Vo for power regeneration sharply drops. This power regenerating operation continues until the external signal 19 becomes "H."

As described above, since the DC-DC converter of Embodiment 5 is structured to receive the external signal 19 which is indicative of an output power dive state, it is possible to further shorten a response time by ensuring that inputting of the external signal 19 is continued to keep power regeneration until the error voltage Ve sufficiently decreases and the output DC voltage Vo settles at the target output voltage E0.

In the DC-DC converter of Embodiment 5, the external signal is set preferably to "L" until the error voltage Ve sufficiently decreases and the output DC voltage Vo settles at the target output voltage E0.

In the above-mentioned Embodiment 5, the step-down type converter which has a synchronous rectifying capability is used in the DC-DC converter, a DC-DC converter according to the present invention is not limited to such a structure. The present invention is applicable also to DC-DC converters having a synchronous rectifying capability of all of the step-down type, the step-up type and the step-up/step-down type.

Embodiment 6

Figure 15:
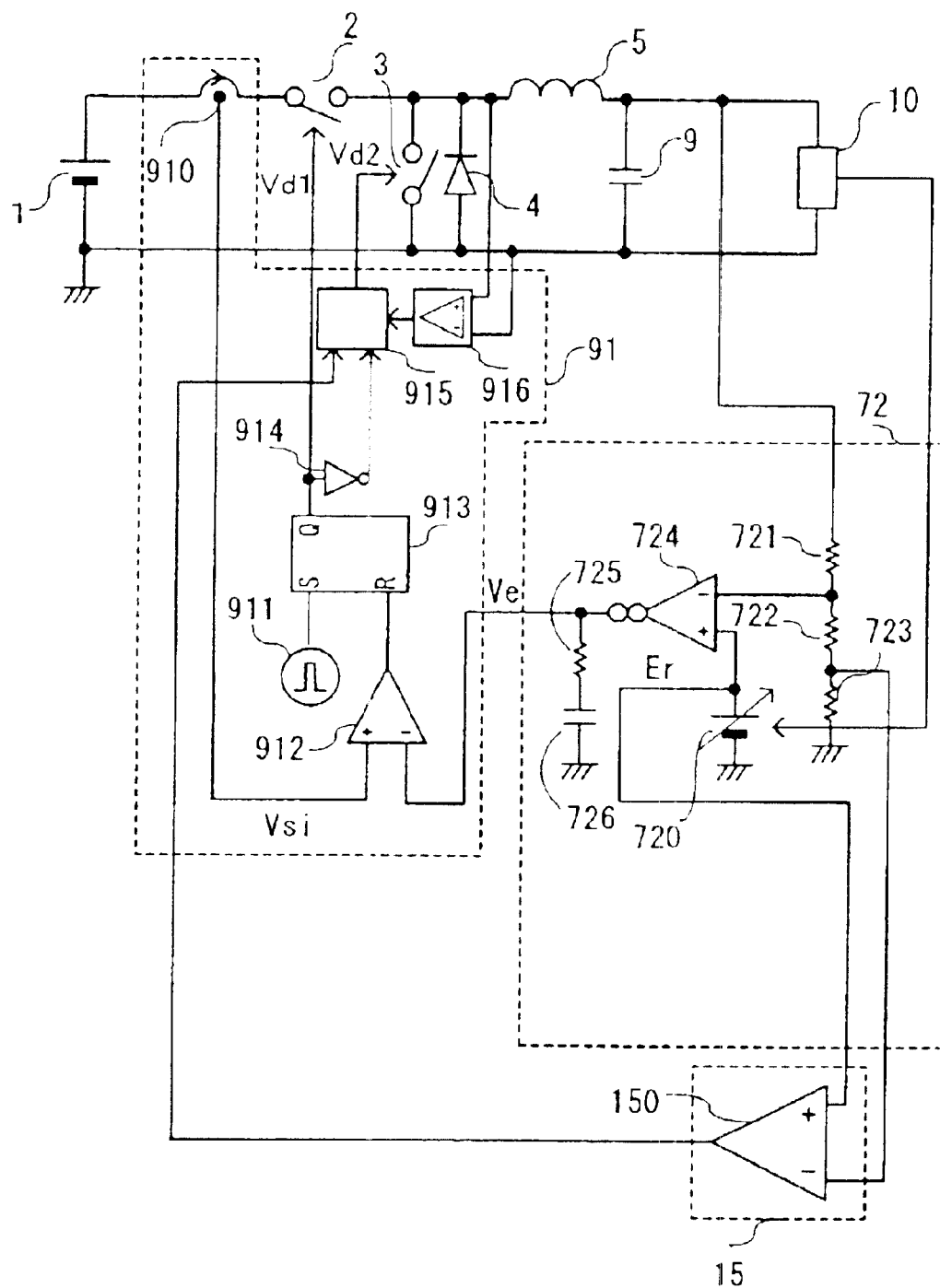
FIG. 15 is a circuitry diagram which shows a structure of a DC-DC converter according to a sixth preferred embodiment of the present invention.

A DC-DC converter of Embodiment 6 according to the present invention will be described with reference to FIG. 15 and FIG. 16. FIG. 15 is a circuitry diagram showing a structure of the DC-DC converter of Embodiment 6 according to the present invention. The DC-DC converter of Embodiment 1 has been described earlier in relation to an example that a control method called "the current mode" which requires to detect a current and control an output DC voltage is used in the present, invention. The DC-DC converter of Embodiment 6 is directed to an application of a control method called "the current mode," which requires to detect a current and control an output DC voltage, to the present invention. In Embodiment 6, parts and elements having substantially the same functions and structures to those of the DC-DC converter of Embodiment 1 are denoted by the same reference numerals and description thereof are omitted. The DC-DC converter of Embodiment 6 is different from the DC-DC converter of Embodiment 1 shown in FIG. 1 in the structures of an error amplifying circuit 72 and a control circuit 91.

In the DC-DC converter of Embodiment 6, the error amplifying circuit 72 has an integrating circuit which comprises a reference voltage source 720, three resistors 721, 722 and 723, an error amplifier 724, and a series circuit having a resistor 725 and a capacitor 726.

In the error amplifying circuit 72, the output DC voltage Vo is divided by the three resistors 721, 722 and 723 and detected. The error amplifier 724 compares the reference voltage Er of the reference voltage source 720 with a voltage at a node between the resistor 721 and the resistor 722 of the three resistors. The error amplifier 724 outputs the error voltage Ve. The series circuit having the resistor 725 and the capacitor 726 is connected to an output terminal of the error amplifier 724, so that a high-frequency gain is reduced. Assuming that $\alpha$ denotes a voltage dividing ratio for the voltage at the node between the resistor 721 and the resistor 722, a first detected voltage fed to an inversion input terminal of the error amplifier 724 is expressed as $\alpha \cdot Vo$. The error voltage Ve decreases when the first detected voltage $\alpha \cdot Vo$ tries to exceed the reference voltage Er, but increases as the detected voltage $\alpha \cdot Vo$ tries to be smaller than the reference voltage Er. When the first detected voltage $\alpha \cdot Vo$ is equal to the reference voltage Er, the output DC voltage Vo has a desirable voltage value. The target output voltage E0 which is this desirable voltage value is expressed by the following formula (10).

$$E0 = Er/\alpha \qquad (10)$$

Further, assuming that β denotes a voltage dividing ratio for a voltage at a node between the resistor 722 and the resistor 723, a second detected voltage is expressed as β·Vo. The comparator 150 compares the second detected voltage β·Vo with the reference voltage Er of the reference voltage source 720. Assuming that an output DC voltage is the upper limit output voltage E1 when the second detected voltage β·Vo is equal to the reference voltage Er, the upper limit output voltage E1 is expressed by the following formula (11). The upper limit output voltage E1 becomes larger than the target output voltage E0 which is this desirable voltage value.

$$E1 = Er/\beta (>E0) \qquad (11)$$

The output from the comparator 150 is fed to a synchronous switch driving circuit 915 of the control circuit 91. The structure of the synchronous switch driving circuit 915 is similar to the structure of the synchronous switch driving circuit 20 which is used in the DC-DC converter of Embodiment 1 described earlier.

The control circuit 91 comprises a current detecting circuit 910, a pulse oscillating circuit 911, a comparator 912, a flip-flop circuit 913, an inverter 914, the synchronous switch driving circuit 915 and a light load detecting circuit 916. The current detecting circuit 910 detects a current which flows in the first switch 2 (hereinafter referred to as a "switch current") and outputs a current detection signal Vsi which is in proportion to the switch current. The pulse oscillating circuit 911 outputs set pulses whose switching frequency is "f". The comparator 912 is provided with the error voltage Ve which is an output from the error amplifying circuit 72 and the current detection signal Vsi outputted from the current detecting circuit 910. When the current detection signal Vsi exceeds the error voltage Ve, the comparator 912 outputs a reset pulse to the flip-flop circuit 913. The flip-flop circuit 913 outputs a drive signal V913 which rises to a high level when the set pulse is received from the pulse oscillating circuit 911 but falls to a low level in response to inputting of an output pulse from the comparator 912.

Figure 16:
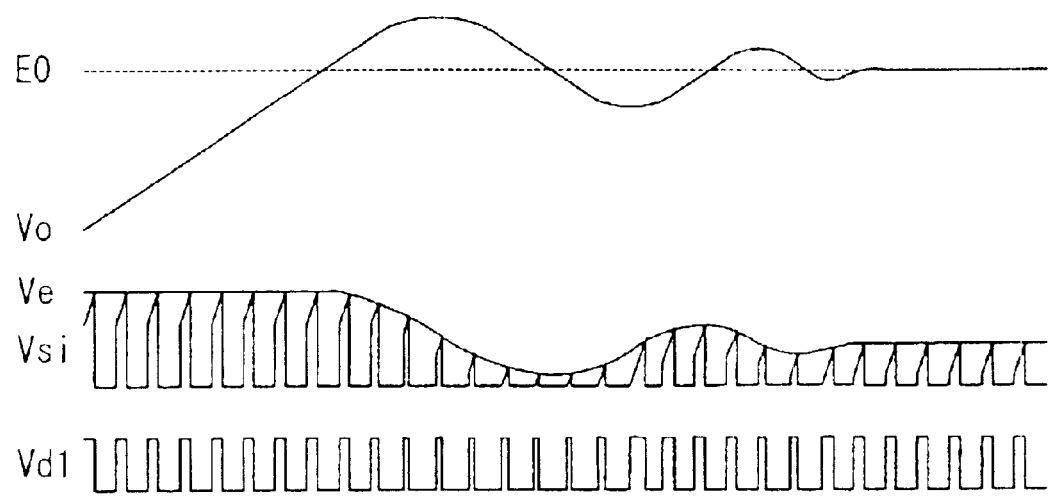
FIG. 16 is a waveform diagram which shows-operations in respective portions of the DC-DC converter of Embodiment 6.
Figure 17:
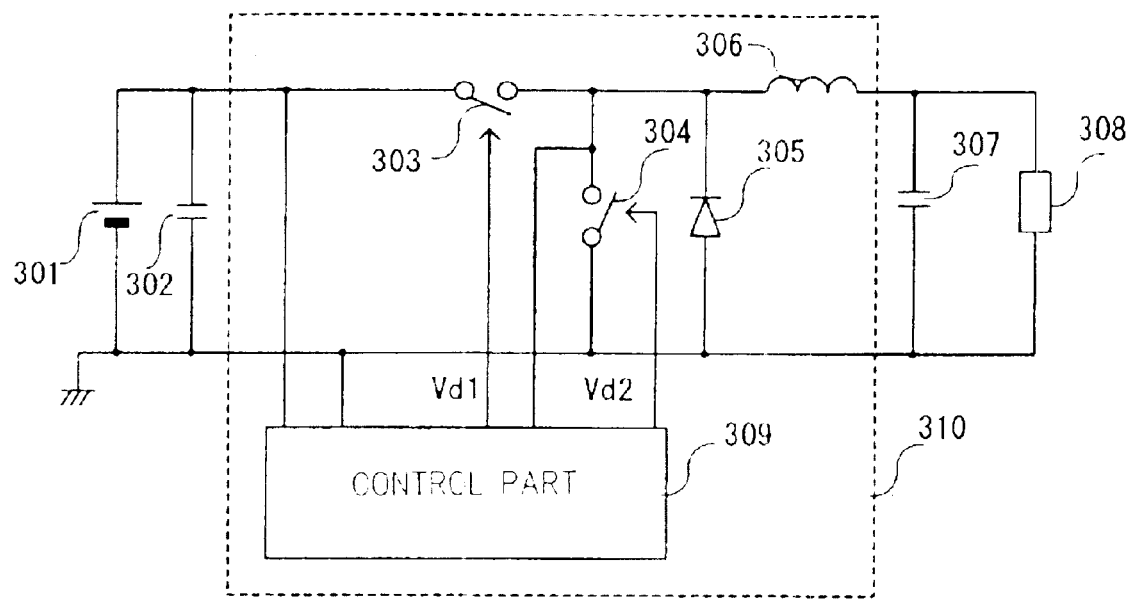
FIG. 17 is a circuitry diagram which shows a structure of a conventional DC-DC converter.
Figure 18:
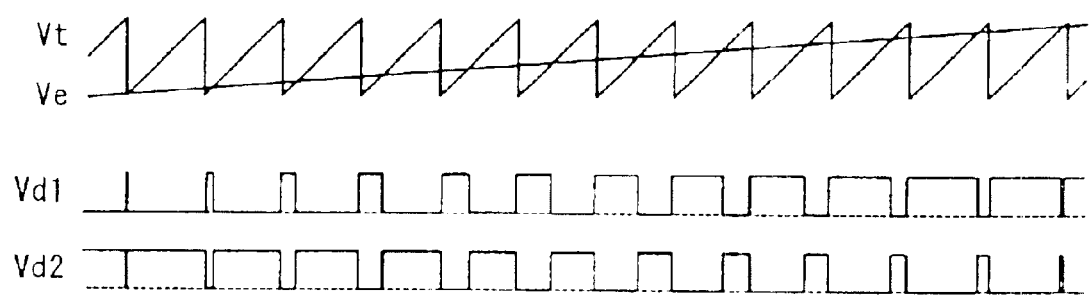
FIG. 18 is a waveform diagram which shows operations in respective portions of a control part in the conventional DC-DC converter.

FIG. 16 shows voltage waveforms in respective portions within the control circuit 91. As shown in FIG. 16, since the peak value of the switch current is decreased as the error voltage Ve becomes low, the pulse width of the drive signal V913 becomes narrow. That is, a duty ratio δ decreases, which suppresses supply of electric power to the load 10. On the contrary, when the error voltage Ve rises, the peak value of the switch current is increased and the pulse width of the drive signal V913 becomes wide. In other words, the duty ratio δ increases and the supply of electric power to the load 10 grows.

As described above, in the DC-DC converter of Embodiment 6, the error amplifying circuit 72 outputs the error voltage Ve which is obtained by amplifying a deviation between the output DC voltage Vo and the target output voltage E0. In the DC-DC converter of Embodiment 6, the peak value of a current which flows in the first switch 2 (the switch current) is adjusted utilizing the error voltage Ve, and the output DC voltage Vo is controlled so as to be the target output voltage E0.

When the reference voltage Er of the reference voltage source 720 is reduced in response to a signal from the load 10 or the like for example while the DC-DC converter is operating in the standby operation mode, the target output voltage E0 and the upper limit output voltage E1 altogether decrease. At this time, the comparator 150 of the output power dive detecting circuit 15 outputs "L" since the detected voltage is higher than the reference voltage Er. The signal "L" is fed to the synchronous switch driving circuit 915. At this time, the output power dive detecting circuit 15 detects an output power dive state while the light load detecting circuit 916 has already detected the light load state, and therefore, the synchronous switch driving circuit 915 outputs a drive voltage V914 of the inverter 914 as it directly is as the drive voltage Vd2 from the second switch 3. Since the second switch 3 consequently turns on and off in synchronization to the first switch 2, during a period that the comparator 150 is outputting the signal "L", the DC-DC converter does not operate in the standby operation mode but operates in the continuous operation mode. This continuous operation mode is a transient response operation mode.

Power is regenerated in the transient response operation mode, and the output DC voltage Vo sharply decreases. The power regenerating operation continues until the output DC voltage Vo reaches the upper limit output voltage E1 and the comparator 150 of the output power dive detecting circuit 15 gets reversed. When the comparator 150 gets reversed, the output power dive detecting circuit 15 enters a state that the output power dive detecting circuit 15 does not detect the output power dive state. At this time, since the light load detecting circuit 916 has detected the light load state, the DC-DC converter operates in the discontinuous operation mode. However, when the error voltage Ve has not decreased sufficiently yet, the output DC voltage Vo starts increasing. The comparator 150 then gets reversed again, the continuous operation mode takes over and power regeneration is performed. The power regenerating operation reduces the output DC voltage Vo, the comparator 150 gets further reversed, and the discontinuous operation mode takes over. In this manner, the operations in the continuous operation mode and the discontinuous operation mode are repeated, whereby the error voltage Ve decreases sufficiently before long and the output DC voltage Vo settles at the target output voltage E0.

Embodiment 1 has been described in relation to a DC-DC converter which controls in the voltage mode, and Embodiment 6 has been described in relation to a DC-DC converter which controls in the current mode. As the foregoing description related to Embodiment 6 has clearly described, a control method of the current mode can be applied to the DC-DC converter according to the present invention, in which case a similar effect as excellent as that promised by a control method of the voltage mode is obtained.

As described in Embodiment 1 through Embodiment 6, the present invention achieves an effect that a response time is shortened upon an output power dive state. The present invention further achieves an effect that when the output DC voltage Vo is higher than the target output voltage E0, the stability of the target output voltage E0 enhances as the target output voltage E0 is regenerated on the input side. Therefore, the DC-DC converter according to the present invention is effective for the purpose of suppressing an overshoot associated with a sudden change in output condition. For example, at the time of starting up of a DC-DC converter, particularly at the time of a start-up when a load is light, as the input DC voltage is applied and the DC-DC converter starts operating, a difference between the output DC voltage Vo and the reference voltage Er grows. This increases the error voltage Ve and hence the peak value of the switch current, thereby sharply increasing the output DC voltage Vo. In a conventional DC-DC converter, the output DC voltage will overshoot during a delay which occurs in an operating circuit which tries to suppress power supply after the output DC voltage Vo has reached the target output voltage E0. When a load is light in particular, the overshoot becomes substantial. In addition, since the stability of the target output voltage E0 is dependent upon a load, it takes a time for the output DC voltage Vo to respond to the target output voltage E0. In the DC-DC converter according to the present invention, when the output DC voltage Vo grows beyond the target output voltage E0 and exceeds the upper limit output voltage, the second switch 3 turns on and off and power is accordingly regenerated. Having such a structure, the DC-DC converter according to the present invention can quickly reduce the output DC voltage Vo and hence shorten a response time to reach the target output voltage E0.

Although the aforementioned Embodiment 6 in relation to a step-down type converter which has a synchronous rectifying capability, the DC-DC converter according to the present invention is not limited to such a structure. The present invention is applicable to DC-DC converters having a synchronous rectifying capability of all of the step-down type, the step-up type and the step-up/step-down type.

The control in the DC-DC converters according to Embodiment 1 through Embodiment 6 is applicable also to a start-up and can shorten a response time to reach the target output voltage E0 at the time of a start-up.

The DC-DC converters according to Embodiment 1 through Embodiment 6 described earlier can be combined with each other to realize the respective functions.

Further, the respective structural portions such as the control part in the DC-DC converters according to Embodiment 1 through Embodiment 6 described earlier can be each structured as an independent unit and used in other embodiment.

As clearly described in detail as the respective preferred embodiments, the DC-DC converter according to the present invention achieves the following effects.

The DC-DC converter according to the present invention is structured that the output power dive detecting circuit is disposed which sets the upper limit output voltage, which is higher a predetermined voltage than the target output voltage which serves as a target for controlling of the output DC voltage, and outputs a result of comparison of the upper limit output voltage against the output DC voltage, and when the output DC voltage is higher than the upper limit output voltage in a light load state, the standby operation mode is deactivated and the transient response operation mode for regenerating power is executed. The present invention therefore achieves an effect that even when the output DC voltage exceeds the target output voltage due to some change in condition, a response speed for the output DC voltage to efficiently reaches the target output voltage greatly improves regardless of the state of a load.

Alternatively, the DC-DC converter according to the present invention is structured that the comparison circuit for detection of an output power dive state is disposed which sets the upper limit output voltage, which is higher a predetermined voltage than the target output voltage which serves as a target for controlling of the output DC voltage, and outputs a result of comparison of the upper limit output voltage against the output DC voltage, and when the output DC voltage is higher than the upper limit output voltage, the DC-DC converter operates in the transient response operation mode for forcibly changing the error voltage in such a manner that the output DC voltage will decrease and that electric power which is regenerated by the power regenerating operation accordingly grows. Thus, the DC-DC converter according to the present invention achieves an excellent effect that it is possible to shorten a response time.

Alternatively, in the DC-DC converter according to the present invention, the output power dive detecting and comparison circuit is disposed which sets the upper limit output voltage, which is higher a predetermined voltage than the target output voltage which serves as a target for controlling of the output DC voltage, and outputs a result of comparison of the upper limit output voltage against the output DC voltage, and when the output DC voltage is higher than the upper limit output voltage and the output DC voltage is higher than the input DC voltage, the error voltage and the offset voltage are forcibly changed such that the output DC voltage will decrease. Since the DC-DC converter according to the present invention therefore operates in the transient response operation mode which allows a further growth in electric power which is regenerated by the power regenerating operation, a response time is shortened. In addition, the present invention therefore achieves an effect that a switching loss decreases and a high efficiency is obtained as the DC-DC converter which has a step-up/step-down capability performs a step-up operation in the transient response operation mode.

Alternatively, in the DC-DC converter according to the present invention, the high-speed response circuit is disposed in which the regeneration switch is disposed between the input and the output, and when the output DC voltage is higher than the upper limit output voltage and the output DC voltage is higher than the input DC voltage, the regeneration switch turns on. This permits an application even to a DC-DC converter which is not capable of executing a power regenerating operation. Hence, even when the output DC voltage exceeds the target output voltage due to some change in condition, it is possible to greatly improve a response speed for the output DC voltage to efficiently reaches the target output voltage, regardless of the state of a load. Further, when the DC-DC converter structure according to the present invention is used in which the high-speed response circuit is disposed in the DC-DC converter having a synchronous rectifying capability, it is possible to further reduce a response time.

Alternatively, the DC-DC converter according to the present invention is structured that the DC-DC converter is provided with the external signal which is indicative of an output power dive state. As the power regenerating operation is always executed while inputting of the external signal continues, a response time is greatly shortened and the circuit is simplified.

The present invention is further applicable to a DC-DC converter which controls in the voltage mode and also to a DC-DC converter which controls in the current mode. Whichever mode the present invention is applied to, the present invention realizes an excellent effect that a response time upon an output power dive state is shortened.

Still further, the DC-DC converter according to the present invention is applicable even to a start-up, and it is possible to shorten a response time to reach the target output voltage even at the time of a start-up.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A DC-DC converter comprising:
an input DC source which supplies an input DC voltage;
a main switch circuit which receives said input DC voltage and performs a switching operation during a predetermined ON-period and a predetermined OFF-period;
an inductor which repeats accumulation and release of magnetic energy in response to said switching operation of said main switch circuit;
a rectifying and smoothing circuit which comprises a synchronous switch circuit and which rectifies and smoothes out a voltage in said main switch circuit or said inductor and supplies an output DC voltage to a load;
an error amplifying circuit which compares said output DC voltage with a reference voltage and outputs an error voltage;
a switch control circuit which adjusts ON and OFF-periods of said main switch circuit and said synchronous switch circuit based on said error voltage and controls said main switch circuit;
a light load detecting circuit which detects that said load is in a light load state;
an output power dive detecting circuit which detects an output power dive state;
a synchronous switch driving circuit which receives an output from said switch control circuit, an output from said light load detecting circuit and an output from said output power dive detecting circuit,
wherein (1) said synchronous switch driving circuit turns off said synchronous switch circuit when said light load detecting circuit detects a light load state and said output power dive detecting circuit fails to detect an output power dive state,
(2) said synchronous switch driving circuit turns on and off said synchronous switch circuit in accordance with an output from said switch control circuit when said light load detecting circuit detects a light load state and said output power dive detecting circuit detects an output power dive state,
(3) said synchronous switch driving circuit turns on and off said synchronous switch circuit in accordance with an output from said switch control circuit when said light load detecting circuit fails to detect a light load state and said output power dive detecting circuit fails to detect an output power dive state, and
(4) said synchronous switch driving circuit turns on and off said synchronous switch circuit in accordance with an output from said switch control circuit when said light load detecting circuit fails to detect a light load state and said output power dive detecting circuit detects an output power dive state.

2. The DC-DC converter in accordance with claim 1, further comprising
a first transient response operation circuit which forcibly changes said error voltage so as to decrease output power, at the time of a transient response when said output power dive detecting circuit detects an output power dive state.

3. The DC-DC converter in accordance with claim 2, wherein said switch control circuit has an offset voltage source, and said DC-DC converter has a second transient response operation circuit which forcibly changes said offset voltage so as to decrease output power, at the time of a transient response when said output power dive detecting circuit detects an output power dive state.

4. A DC-DC converter comprising:
an input DC source which supplies an input DC voltage;
a main switch circuit which receives said input DC voltage and performs a switching operation during a predetermined ON-period and a predetermined OFF-period;
an inductor which repeats accumulation and release of magnetic energy in response to said switching operation of said main switch circuit;
a rectifying and smoothing circuit which comprises a synchronous switch circuit and which rectifies and smoothes out a voltage in said main switch circuit or said inductor and supplies an output DC voltage to a load;
an error amplifying circuit which compares said output DC voltage with a reference voltage and outputs an error voltage;
a control circuit which adjusts ON and OFF-periods of said main switch circuit and said synchronous switch circuit based on said error voltage and drives said main switch circuit and said synchronous switch circuit;
an output power dive detecting circuit which detects an output power dive state; and
a first transient response operation circuit which forcibly changes said error voltage so as to decrease output power, at the time of a transient response when said output power dive detecting circuit detects that output power has sharply dropped.

5. The DC-DC converter in accordance with claim 4, wherein
said control circuit has an offset voltage source which outputs an offset voltage,
and further comprising a second transient response operation circuit which forcibly changes said offset voltage so as to decrease said output power, at the time of a transient response when said output power dive detecting circuit detects that output power has sharply dropped.

6. A DC-DC converter comprising:
an input DC source which supplies an input DC voltage;
a main switch circuit which receives said input DC voltage and performs a switching operation during a predetermined ON-period and a predetermined OFF-period;
an inductor which repeats accumulation and release of magnetic energy in response to said switching operation of said main switch circuit;
a rectifying and smoothing circuit which rectifies and smoothes out a voltage in said main switch circuit or said inductor and supplies an output DC voltage to a load;
an error amplifying circuit which compares said output DC voltage with a reference voltage and outputs an error voltage;
a control circuit which adjusts the ON and OFF-periods of said main switch circuit based on said error voltage and controls said main switch circuit;
an output power dive detecting circuit which detects an output power dive state;

an input/output comparison circuit which compares said input DC voltage with said output DC voltage; and a high-speed response circuit which comprises a regeneration switch circuit connected in parallel between an input and output of said DC-DC converter, and which turns on said regeneration switch circuit at the time of a transient response when said output power dive detecting circuit detects an output power dive state when said output DC voltage is higher than said input DC voltage.

7. The DC-DC converter in accordance with claim 1, wherein said output power dive detecting circuit has such a structure that said output power dive detecting circuit sets an upper limit output voltage which is higher a predetermined voltage than a target output voltage which serves as a target for controlling of said output DC voltage, said output power dive detecting circuit comprises a comparison circuit which compares said upper limit output voltage with said output DC voltage, and said output power dive detecting circuit detects, as the time of said transient response, a period in which said output DC voltage is higher than said upper limit output voltage.

8. The DC-DC converter in accordance with claim 1, wherein a signal indicating an output power dive state is inputted from said load which is connected to said DC-DC converter.

9. A DC-DC converter comprising:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a switch control circuit which adjusts ON and OFF-periods of said main switch circuit and said synchronous switch circuit based on said error voltage and controls said main switch circuit;

a light load detecting circuit which detects that said load is in a light load state; and a synchronous switch driving circuit which receives an output from said switch control circuit, an output from said light load detecting circuit and a signal indicating whether output power has sharply dropped or not, wherein (1) said synchronous switch circuit turns off when said light load detecting circuit detects a light load state and said output power has not sharply dropped, (2) said synchronous switch circuit turns on and off in accordance with an output from said switch control circuit when said light load detecting circuit detects a light load state and said output power has sharply dropped, (3) said synchronous switch circuit turns on and off in accordance with an output from said switch control circuit when said light load detecting circuit fails to detect a light load state and said output power has not sharply dropped, and (4) said synchronous switch circuit turns on and off in accordance with an output from said switch control circuit when said light load detecting circuit fails to detect a light load state and said output power has sharply dropped.

10. A DC-DC converter comprising:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which comprises a synchronous switch circuit and which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts ON and OFF-periods of said main switch circuit and said synchronous switch circuit based on said error voltage and drives said main switch circuit and said synchronous switch circuit; and a first transient response operation circuit which forcibly changes said error voltage so as to decrease said output power, at the time of a transient response when a signal indicating output power sharply reduced is inputted from said load.

11. The DC-DC converter in accordance with claim 10, wherein said control circuit has an offset voltage source which outputs an offset voltage, and further comprising a second transient response operation circuit which forcibly changes said offset voltage so as to decrease said output power, at the time of a transient response when a signal indicating output power sharply reduced is inputted from said load.

12. A DC-DC converter comprising:

an input DC source which supplies an input DC voltage;

a main switch circuit which receives said input DC voltage and performs a switching operation during a predetermined ON-period and a predetermined OFF-period;

an inductor which repeats accumulation and release of magnetic energy in response to said switching operation of said main switch circuit;

a rectifying and smoothing circuit which rectifies and smoothes out a voltage in said main switch circuit or said inductor and supplies an output DC voltage to a load;

an error amplifying circuit which compares said output DC voltage with a reference voltage and outputs an error voltage;

a control circuit which adjusts the ON and OFF-periods of said main switch circuit based on said error voltage and controls and drives said main switch circuit;

an input/output comparison circuit which compares said input DC voltage with said output DC voltage; and a high-speed response circuit which comprises a regeneration switch circuit connected in parallel between an input and output of said DC-DC converter, and which turns on said regeneration switch circuit at the time of a transient response when a signal indicating output power sharply reduced is inputted from said load, in case that said output DC voltage is higher than said input DC voltage.

* * * * *